(12) United States Patent
Cioffi et al.

(10) Patent No.: US 8,842,527 B2
(45) Date of Patent: Sep. 23, 2014

(54) HIGH SPEED MULTIPLE USER MULTIPLE LOOP DSL SYSTEM

(75) Inventors: John M. Cioffi, Atherton, CA (US);
George Ginis, San Mateo, CA (US);
Sumanth Jagannathan, Palo Alto, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 82 days.

(21) Appl. No.: 12/445,278

(22) PCT Filed: Oct. 11, 2007

(86) PCT No.: PCT/US2007/021779
§ 371 (c)(1),
(2), (4) Date: Nov. 18, 2009

(87) PCT Pub. No.: WO2008/045525
PCT Pub. Date: Apr. 17, 2008

(65) Prior Publication Data
US 2010/0074312 A1 Mar. 25, 2010

Related U.S. Application Data

(60) Provisional application No. 60/850,848, filed on Oct. 11, 2006.

(51) Int. Cl.
*G01R 31/08* (2006.01)
*H04M 11/06* (2006.01)

(52) U.S. Cl.
CPC .................................. *H04M 11/062* (2013.01)
USPC ............ 370/229; 370/351; 370/389; 370/400

(58) Field of Classification Search
None
See application file for complete search history.

(56) References Cited

U.S. PATENT DOCUMENTS

| 6,396,912 | B1 * | 5/2002 | Mueller et al. | 379/93.32 |
| 6,928,068 | B1 * | 8/2005 | Crowe et al. | 370/352 |
| 7,106,789 | B1 | 9/2006 | Rezvani | |
| 7,283,551 | B1 * | 10/2007 | Algie | 370/442 |
| 7,809,116 | B2 * | 10/2010 | Rhee et al. | 379/1.04 |

(Continued)

FOREIGN PATENT DOCUMENTS

| JP | 2001514461 | 9/2001 |
| JP | 2001532424 | 9/2001 |
| JP | 200572886 | 3/2005 |

OTHER PUBLICATIONS

International Search Report and Written Opinion of the International Searching Authority, International Application No. PCT/US2007/021779, mailed Aug. 14, 2008, Whole Document.

(Continued)

*Primary Examiner* — Robert Wilson
(74) *Attorney, Agent, or Firm* — Blakely, Sokoloff, Taylor & Zafman

(57) ABSTRACT

A high speed multiple user multiple-loop DSL system is described. In one embodiment, it includes a first DSL loop to carry DSL traffic to a first user and a second DSL loop to carry DSL traffic to a second user. A first junction connects the traffic of the first DSL loop to a third DSL loop, and a second junction connects the traffic of the second DSL loop to the third DSL loop.

18 Claims, 15 Drawing Sheets

(56) References Cited

U.S. PATENT DOCUMENTS

| | | | |
|---|---|---|---|
| 2003/0165235 A1 | 9/2003 | Aghdam et al. | |
| 2005/0152385 A1* | 7/2005 | Cioffi | 370/420 |
| 2006/0039454 A1* | 2/2006 | Cioffi | 375/222 |
| 2006/0098725 A1* | 5/2006 | Rhee et al. | 375/222 |
| 2006/0268966 A1* | 11/2006 | Cioffi et al. | 375/222 |
| 2008/0205501 A1* | 8/2008 | Cioffi et al. | 375/224 |
| 2009/0207985 A1* | 8/2009 | Cioffi et al. | 379/93.01 |
| 2010/0074312 A1* | 3/2010 | Cioffi et al. | 375/222 |
| 2011/0051593 A1* | 3/2011 | Cioffi et al. | 370/200 |

OTHER PUBLICATIONS

Office Action for Australian Patent Application No. 2007308107, Mailed Jun. 30, 2011, 3 pages.
Office Action for Japanese Patent Application No. 2009-532424, Mailed Jul. 19, 2011, 8 pages.
Office Action for Chinese Patent Application No. 200780041916.X, Mailed Aug. 15, 2011, 6 pages.
Office Action for Japanese Patent Application No. 2009-532424, Mailed Jul. 17, 2012.
Second Office Action for Chinese Patent Application No. 200780041916.X, Mailed Jul. 20, 2012.
Notice of Allowance for Australian Patent Application No. 2007308107, Mailed Aug. 21, 2012.
Notice of Allowance for Japanese Patent Application No. 2009-532424, Mailed Mar. 18, 2013.
Final Office Action for Chinese Patent Application No. 200780041916.X, Mailed Mar. 28, 2013.
Notice of Allowance for Chinese Patent Application No. 200780041916.X, Mailed Oct. 10, 2013, 4 pages.

* cited by examiner

US 8,842,527 B2

1

HIGH SPEED MULTIPLE USER MULTIPLE LOOP DSL SYSTEM

This application is a U.S. National Phase application under 35 U.S.C. 371 of International Application No. PCT/US2007/021779, filed on Oct. 11, 2007, entitled HIGH SPEED MULTIPLE USER MULTIPLE LOOP DSL SYSTEM, which claims priority to U.S. Provisional Patent Application No. 60/850,848, filed on Oct. 11, 2006.

BACKGROUND

1. Field

The present description relates to the field of communications using multiple loop DSL connection and, in particular, to sharing such connections among multiple users.

2. Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) and very-high-speed DSL (VDSL) can adapt to the characteristics of the subscriber line by using a discrete multitone (DMT) line code that assigns a number of bits to each tone (or sub-carrier), which can be adjusted to channel conditions determined during initialization and subsequent on-line adaptation known as "bit-swapping" and "gain swapping" of the modems (typically transceivers that function as both transmitters and receivers) at each end of the subscriber line.

Currently, VDSL2 systems can achieve data rates of up to approximately 150 Mbps (Megabits per second) on short loops and ADSL2+ systems can achieve data rates of up to approximately 25 Mbps on somewhat longer loops than VDSL. "Short loops" are typically considered to be loops in which the component wires are about 100 meters or less, and in any event no more than 300 meters. Higher data rates are usually limited by the line attenuation on longer loops. On short loops higher data rates are generally limited by the maximum bandwidth used by the ADSL and VDSL modems and by frequency-selective noises caused by crosstalk from other phone lines sharing the same cable, radio ingress, and a variety of customer-premises noises often known generically as impulse noise. These short loops are found at various points in a typical DSL plant.

G-PONs (gigabit passive optical networks) and E-PONs (ethernet passive optical networks) are now used for communications and use optical signals transmitted through optical fiber. Such systems can achieve speeds of ~1-2.5 Gbps (Gigabit per second) in each direction, using time division multiplexing and upstream dynamic bandwidth allocation. Such a system can have up to 128 customers sharing a line from an optical line terminal (OLT), with each customer having a peak speed of 100 Mbps to 1 Gbps, and average continuous speeds (for example, for use in connection with video) of 20-30 Mbps with 32-128 users. Splitters are placed along such a line for customer drops.

These higher data rate optical systems allow data to be sent at still higher rates to DSL customers. Higher rate DSL service can be provided by using more loops to carry a single stream of packets. However several loops are needed in order to meet the data rates of the optical systems. This many loops are often not available to any one customer. U.S. Patent Application Publication No. 2003/0208772 A1 published Nov. 6, 2003 of Milbrandt describes communicating data for multiple users in which each user receives the same multiple user data on its own single DSL line, but the effect is to reduce data rates.

SUMMARY

A high speed multiple user multiple loop DSL system is described. In one embodiment, it includes a first DSL loop to carry DSL traffic to a first user and a second DSL loop to carry DSL traffic to a second user. A first junction connects the traffic of the first DSL loop to a third DSL loop, and a second junction connects the traffic of the second DSL loop to the third DSL loop.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
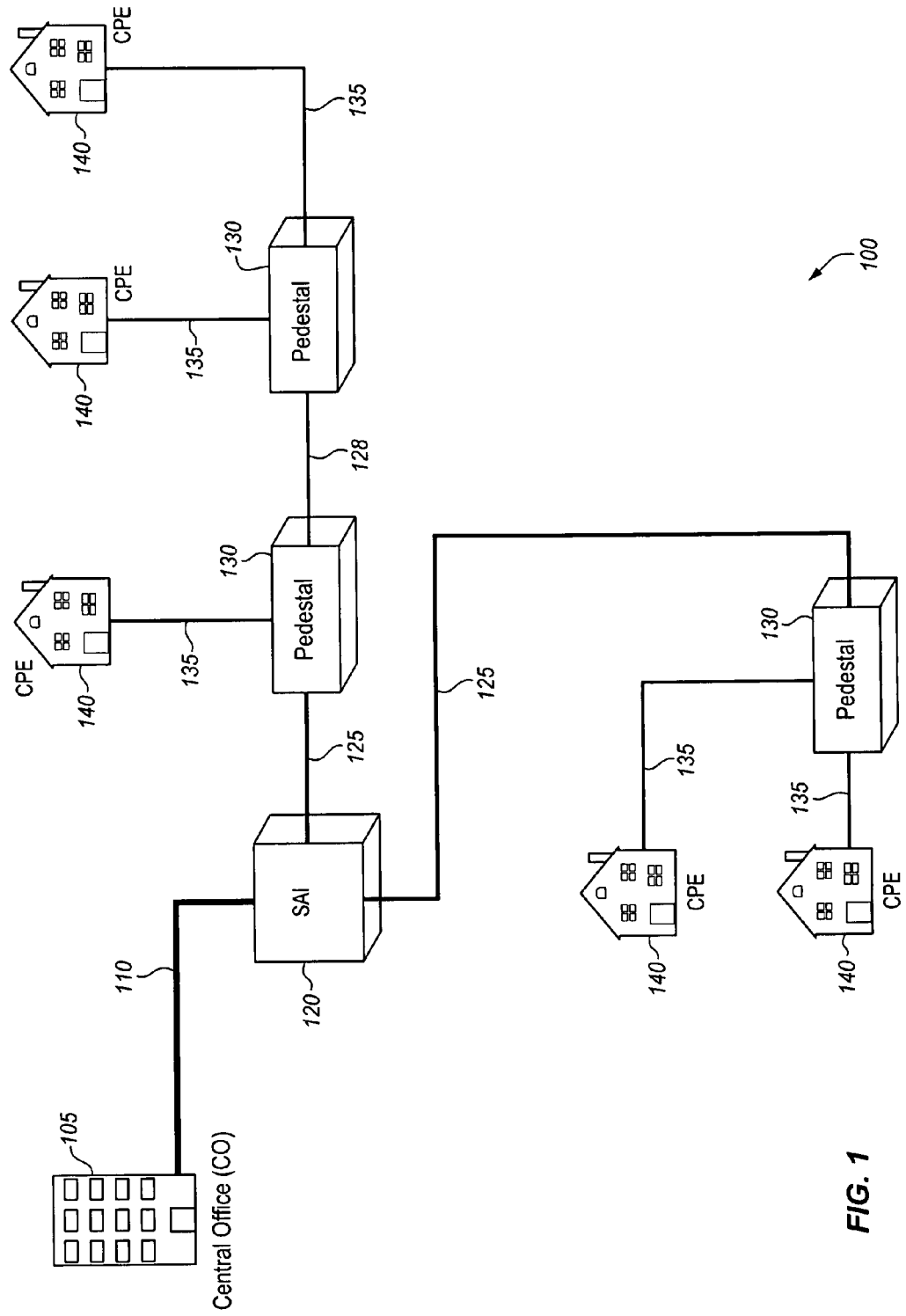
FIG. 1 is a block diagram of an example of a DSL communication system suitable for implementing embodiments of the present invention.

Embodiments of the present invention leverage the use of multiple loops in a DSL system where the loops can be bonded and are short (although the present invention is not limited solely to short loops). Bonding the loops and vectoring the data transmission on the loops allows the creation and operation of a multiple channel system that typically can achieve data rates greater than the sum of the data rates of the individual loops when operated as individual DSL loops. The multiple loops can be shared between several users so that still higher data rates can be obtained when the other users are not busy.

The term subscriber loop or "loop" refers to the loop that is formed by the line that connects each subscriber or user to the central office (CO) of a telephone operator (or possibly a remote terminal (RT) of such an operator). A typical topology 100 of a DSL plant is presented in FIG. 1. As can be seen, a CO 105 provides high bandwidth transmission via a feeder 110 (which can be a high-bandwidth link, such as a fiber-optic cable, or a binder with a number of copper lines running through it, or even a high-bandwidth wireless system). The feeder 110 may connect the CO 105 to a serving area interface (SAI) 120 (which may be or contain an optical networking unit or ONU). From interface 120, a number of copper lines 125 may then extend to a pedestal 130 (sometimes called a cabinet) near one or more customer premises equipment (CPE) locations 140. Such pedestals are not uncommon on each block of a street or neighborhood, for example. In some cases, pedestals are intermediate points between a CO, SAI and/or other pedestals. For example, in FIG. 1, an inter-pedestal link 128 allows service for one CPE to be split to that CPE, while the lines continue on to another pedestal and to one or more other CPEs.

Pedestals offer a cross connection point between lines going to a specific or a few customer premises (often referred to as a "drop") as in the drop 135 of FIG. 1 and the remainder of lines that may continue to other pedestals. Often the existing line is not connected to any other CPE beyond the drop, but continues in the cable to its end. Typically, there are 2 to 6 lines in the "drop" segment to each customer, providing extra copper for the contingency of one or more customers later demanding multiple phone services. The cable back to the ONU or central office usually does not have 2-6 times as many phone lines as would be needed by all the customers (because not all customers will demand that many phones). However, the pedestal drops typically have extra copper.

This extra copper is exploited in embodiments of the present invention when fiber or other high-bandwidth media passes to the pedestals and when those pedestals are upgraded both for bonding and electronic vectoring of the lines in the drop segment to a customer (and thus interface that group of one customer's lines to the fiber or other high-bandwidth media, including in particular the copper telephone lines that pass to the pedestal).

While the term pedestal is used in examples discussed herein, many other equivalent names are used in practice such as boxes, service terminals, cabinets, etc. Embodiments of the present invention described herein are equally applicable to all such locations. Furthermore, the continuing connection between pedestals could actually be in the nature of a repeater function, continuing service to other pedestals or connection points. In particular, the equivalent architecture using fiber could be a passive optical network, a multi-user sharing of a single fiber that would connect all the pedestals.

Connections to pedestals, if optical fiber, could be part of a passive optical network (PON), which would then have an optical splitter at each pedestal, which functions logically as a T connection to a single fiber. In the future, an Ethernet PON (EPON) may use fiber running to 10 Gbps (Gigabits per second) on a single wavelength and pedestal connections running several Gbps rates. Today, the recent EPON standard transmits 1 Gbps on the fiber and each ONT may share this medium in a time division multiplexed burst manner, typically with a maximum individual Ethernet speed of 100 Mbps. That, too, could be used where pedestals only run at 100 Mbps. Some fiber systems may allow the use of multiple wavelengths and with Gbps data rates on each, but are also more costly.

Part of each subscriber loop may be collocated with the loops of other users within a multi-pair binder (or bundle). As seen in FIG. 1, after the pedestal 130, very close to the CPE 140, one or more loops take the form of a drop segment 135 that exits the bundle. The subscriber loop can thus traverse different environments. Part of it typically is located inside a binder, where the loop is shielded from external electromagnetic interference, but is subject to crosstalk, which is interference from other subscriber loops hosted by the binder. After the pedestal 130, the drop wire(s) 135 may or may not be affected by crosstalk, depending on distances from other twisted wire pairs, but transmission also can be impaired by electromagnetic interference because drop wires typically are unshielded.

In the following discussion, examples using 4 loops will be presented, although embodiments of the present invention can use 2, 3, 4 or more loops in the systems, methods and techniques described herein. Moreover, the multiple-loop segments discussed herein may be referred to as "drops" for ease of explanation but, again, the present invention is not limited solely to drops from pedestal to CPE. Embodiments, of the present invention may be applied in any suitable location or site in a DSL topology. For example, connections between pedestals can be converted to "supervectored" segments using embodiments of the present invention and coordinating, for example, 8-20 loops to carry several Gbps.

DSL bonding uses line aggregation to combine multiple independent DSL loops into a single logical channel for high-speed transmission. There are several techniques for implementing DSL Bonding. For example, DSL bonding can be done in conjunction with Copper Mountain's CopperEdge DSLAMs with Multilink Frame Relay technology implementation. This type of DSL bonding is also referred to as DSLAM-based DSL bonding. Another example is the industry standard Multilink PPP (MP), which is implemented in a customer's DSL router and the ISP's DSL subscriber management system or router (for example, Redback or Cisco). MP bonding creates a bonded or aggregated connection consisting of two or more independent DSL loops. DSL bonding over Multilink PPP (MP) requires the DSLAM be configured to support PPP.

Using either of these DSL bonding techniques, multiple DSL loops can be aggregated to create a single logical data channel that is the sum of the individual lines' bandwidth, minus a small amount used for overhead. In addition to aggregating multiple DSL loops, both techniques perform automatic balancing of traffic across the links and actively monitor the performance of the bonded connection. Should one of the links fail for any reason, traffic is automatically forwarded to the active link. When the failed link is restored, the bonded connection is also transparently restored. From this perspective, DSL bonding not only provides increased bandwidth, but it also provides redundancy in the event of line failure.

Various protocols can be considered and implemented for bonding in embodiments of the present invention. For example, time-division inverse multiplexing (TDIM bonding), Ethernet Transport for Single and Multiple-Pair xDSL Systems (Ethernet bonding), and ATM (Asynchronous Transfer Mode)-based multi-pair bonding (ATM bonding) may be used. The G.bond standard promulgated by the ITU (International Telecommunications Union) may alternatively be used. G.bond is also known as ADSL2+ port bonding or ITU G.998.x.

In some embodiments of the present invention, vectoring can be used. Vectoring is a technique in which all DSL lines are synchronized in DMT symbol rate and crosstalk nominally is cancelled. Vectoring can also be used to increase the bandwidth by exploiting crosstalk between the individual wires. Each loop in DSL consists of two wires either from a twisted-pair or from two wires in a quad. Thus, 4 loops actually consist of 8 wires. In effect, each of the 7 wires referenced to a common 8th wire presents an opportunity for transmission of useful data and any crosstalk between the 7 data bearing wires is cancelled via synchronized, coordinated transmission on the 7 channels created by bonding the 4 loops.

In general, for a given number of loops K, the maximum number of channels available for data transmission is twice the number of loops minus one (that is, 2K−1). Further, not all channels need be excited nor all possible signals received, which can lead to a non-square channel transfer comprising from 1 to (2K−1) transmitters and from 1 to (2K−1) receivers. If the sheath of the cable is used as a reference, then the channels available for data transmission become equal to 2K. The number of transmitters and receivers need not be the same, but simply coordinated by vectoring since all are contributing to the overall data rate for the set of drop wires to an individual customer.

Techniques to allocate power and vector transmission that may be used with the present invention are disclosed in more detail, for example, in U.S. Pat. No. 7,158,563, issued Jan. 2, 2007 to Ginis et al, entitled Dynamic Digital Communication System Control. However, other vectoring techniques may be used as alternatives or in addition.

Figure 2:
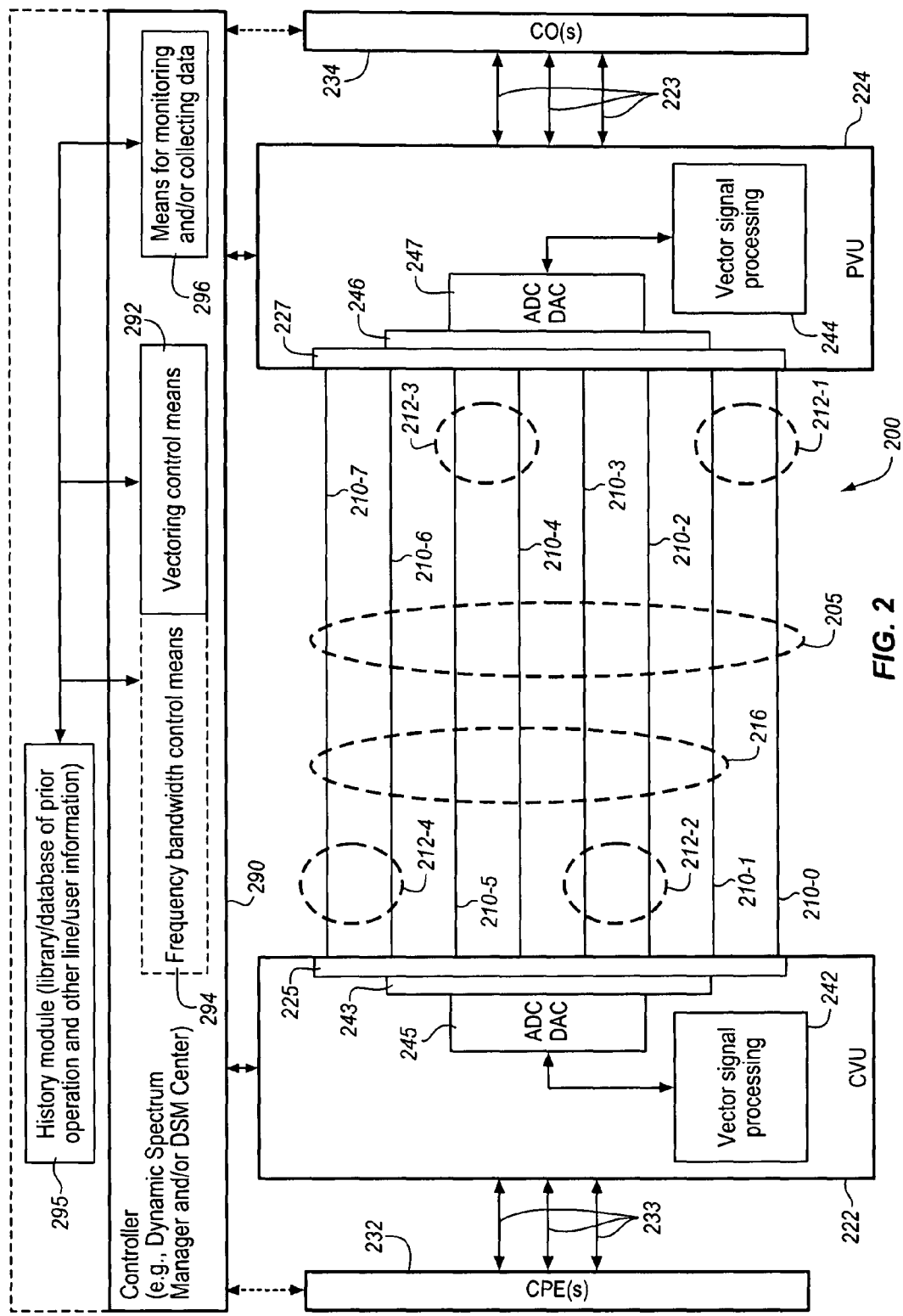
FIG. 2 is a block diagram of a DSL system between a DSLAM or CO and a CPE according to an embodiment of the present invention.

In FIG. 2, operation of a PVU (Pedestal Vectoring Unit) 224 and CVU (Customer Vectoring Unit) 222, as well as other components, if desired, is controlled by a controller 290 that manages system 200. As seen in FIG. 2, controller 290 (for example, a dynamic spectrum manager and/or DSM center using a computer system) is coupled to and communicates with the VUs (Vectoring Units) 222, 224. CVU 222 includes an MIMC (matrix impedance matching circuit) 225 coupled to the customer end of the segment 205. Appropriate filters 243 and an analog-to-digital/digital-to-analog converter 245 can also be coupled to the MIMC 225. A vector signal processing module 242 is coupled to the customer end of the segment 205 as well. The vector signal-processing module 242 can be a computer, integrated circuit (or "chip") or other suitable device for processing signals received and/or transmitted on the segment 205. In the embodiment of the present invention shown in FIG. 2, module 242 is coupled to the vectoring control means 292 of controller 290, which assists in regulating (for example, one-sided and/or two-sided vectoring) transmissions across the segment and can provide control information and instructions (for example, coefficients used in signal processing for one-sided and/or two-sided vectoring).

Similarly, PVU 224 includes an MIMC 227 coupled to the pedestal end of the segment 205. Appropriate filters 246 and an analog-to-digital/digital-to-analog converter 247 can also be coupled to the MIMC 227. A vector signal processing module 244 is coupled to the pedestal end of the segment 205 as well. Module 244 can be a computer, integrated circuit, chip or other suitable device for processing signals received and/or transmitted on the segment 205. In the embodiment of the present invention shown in FIG. 2, module 244 is coupled to the vectoring-control means 292 of controller 290, which can provide control information and instructions (for example, coefficients used in signal processing for one-sided and/or two-sided vectoring). Modules 242, 244 may also be implemented as part of the controller 290 or be located somewhere other than inside their respective VUs.

The eight illustrated lines 210-0 to 210-7 connecting the CVU and the PVU are typically operated in pairs shown as 212-1, consisting of lines 210-0 and 210-1, pair 212-2, consisting of lines 210-2 and 210-3 and so on for the other two pairs 212-3 and 212-4. Bonding is also shown for the lines 210-0 to 210-7. The lines 210 include a reference wire (for example, wire 210-0) and a communication link 216 having 7 available channels, where anywhere from 1 to 7 of the channels may be used (thus yielding a channel matrix having dimensions up to a 7×7 matrix). The lines can also be operated in other groupings, depending on the circumstances.

In some embodiments of the present invention, the controller 290 may communicate with a remote location, such as downstream VU 222, via the link 216 rather than directly. Also, the controller 290 may be coupled to the CPE(s) 232 and/or CO(s) 234, if desired, which link may be used for communicating with the respective VUs. Communication with the VUs can be accomplished in a variety of ways using various types of links (including, for example, the DSL system itself, email, ftp (file transfer program) over the internet, or some other "external" communication means, etc.). One practical partitioning is for a remote controller (for example a DSM center) to collect the data from initialization and operations that can be used to construct the H matrix describing the matrix channel, analyze noise, and then make decisions on the appropriate vectors to be used by the VUs. In this way, a remote capability for such computationally intensive functions and determinations could be shared (rather than embedding this function at the VU location where power, memory, computation and cost are at a premium).

Controller 290 includes segment monitoring means 296, which collects data regarding operation of the system 200 and may provide this data to a history module 295, such as a database. Vectoring-control means 292 uses this data to generate control signals sent to the vector signal-processing modules 242, 244 for VUs 222, 224, respectively. These vectoring control signals provide information on the bit distributions, margins, transmission power levels and other operational information needed to operate the vectored system 200 properly (for example, at the highest aggregate data rate available within any given constraints). Again, this can include what mode of vectoring to use (for example, one-sided or two-sided, as described above) and coefficients and other data needed to process signals for segment 205 (e.g. minimum/maximum data rate, minimum/maximum margin, required minimum impulse noise protection, maximum interleaving delay, FEC codeword parameters).

Controller 290 also may include a frequency-bandwidth control means 294, which generates frequency-bandwidth control signals used by the VUs 222, 224 to determine what frequency bandwidths will be used for communication on link 216. Such control signals may be used for direct or indirect determination of tables of time-slot assignments, which are explained later. In generating their respective control signals, both means 292, 294 may consult or otherwise use historical performance and operational data in a library module 295 or the like. As noted above, module 295 might take the form of a database coupled to a computer system. Means 292, 294, 296 can be implemented as software, hardware or a combination of both software and hardware (for example, one or more computer systems and/or integrated circuits).

A controller implementing one or more embodiments of the present invention can be a dynamic spectrum manager or spectrum management center and can be a computer-implemented device or combination of devices that monitors the appropriate system 200 and data relating thereto. The controller may directly or indirectly dictate/require changes in the operation of system 200 by users and/or equipment coupled to the controller or may only recommend changes. In some embodiments, upstream VUs to which the controller is coupled may all reside in the same location (for example, a DSL central office) and may or may not share other resources for their respective transmission channels. The structure, programming and other specific features of a controller usable in connection with embodiments of the present invention may be adapted to suit any particular circumstances.

The controller can reside in one or more locations. For example, the controller may reside in the CO to which a CPE is coupled. Moreover, in some embodiments, the controller may reside in a pedestal or other intermediate location within a DSL plant. Finally, the controller may reside in the CPE (for example, in a user-side transceiver, modem or the like).

Thus, embodiments of the present invention provide substantial improvements in data rate for short length DSL systems where multiple loops are available for bonding and vectoring, or other coordination that provides similar functionalities. In the exemplary system of FIG. 2, the 4 loops could individually be able to achieve rates of approximately 150 Mbps per loop, yielding an aggregate data rate to the CPE(s) of approximately 600 Mbps over the 4 loops. Using one of the 7 channel bonded and vectored configurations of FIG. 2, rates of over 1,000 Mbps (1 Gbps) can be realized—an increase of over 65% as compared to the aggregate data rate of the individual lines.

Frequency-division-multiplexing (FDM), echo/NEXT (Near End Cross Talk) cancellation or some combination of the two can be used to separate upstream and downstream transmission. Echo/NEXT cancellation will attain the highest data rates if there are less than (2K−1) sources of independent noise (that is not generated from any of the (2K−1) coordinated wires) in the drop segment (including drop upstream-into-downstream NEXT from other customers' upstream CVU transmitters in the same drop), because the full bandwidth is used in both up and down directions. FDM can be used and is simpler to implement when there is a concern about a surplus of other customers' crosstalk in the same drop segment.

Assuming symmetric transmission, the data rates attainable with FDM are approximately 50% of the data rates attainable with NEXT/echo cancellation in the absence of NEXT from any other groups of wires. Wires from loops 212 that normally would be theoretically considered or deemed reference wires (most DSLs are differentially transmitted and received; therefore, calling one of the two wires in a loop the "reference wire" is convenient for theoretical purposes) and therefore would not carry any data (for example, wires 210-2, 210-4, 210-6 that would be the reference wires for loops 212-2, 212-4 and 212-4, respectively, in FIG. 2) can be used for data transport as well. These extra wires can be employed and combined in the bonded, vectored environment of system 200.

The use of these extra wires is equivalent to the use of all the transverse electromagnetic modes of propagation in the transmission binder and, in particular, the extra signals can sometimes be referenced between the average voltages between the two wires of a single pair with respect to the average voltages between the two wires of a different single pair, sometimes called "center to center" of the loops. These signals so referenced are called "phantoms."

Figure 3:
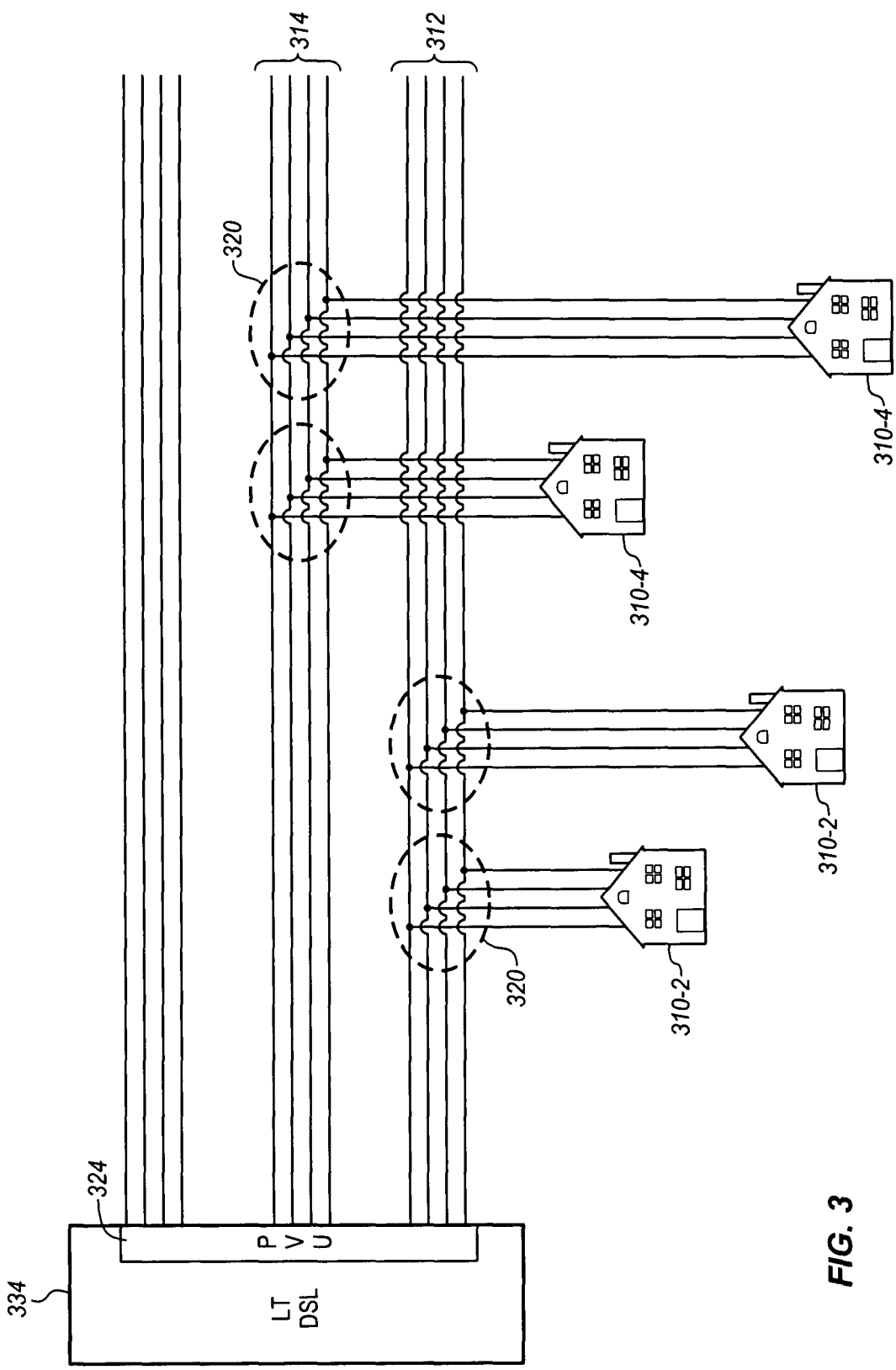
FIG. 3 is an example of a DSL system showing multiple loop junction taps coupling users to multiple loop segments according to an embodiment of the invention.

In some embodiments of the present invention, a single multiple loop system, such as those shown in FIG. 3, can be used as a "trunk" for multiple users' access to the multiple loop system. For example, in FIG. 3, users 310-2 access multiple loop system 312. Similarly, users 310-4 access multiple loop system 314. Each multiple loop system 312, 314 and the like can have anywhere from 1 to as many as hundreds of DSL loops that function in the aggregate as a single DSL system, as described above. The number of DSL loops used in a given multiple loop segment and/or multiple loop junction tap will depend on various factors, such as the number of loops in a given binder, the number of wires in a drop to a user's CPE, etc. For example, in many homes in the United States, a 4 loop drop is common and thus could be implemented without the need for any further wiring, other than connecting the 8 wires in the drop to the appropriate wires in the multiple loop segment 312, 314. In some parts of the world, "quads" or groups of 4 wires twisted together constitute the drop segment (and there may be one or two quads in such a drop).

It may be economically feasible in some cases, too, to install additional loops/wires for a given user's needs or desired performance. Sharing of copper using multiple taps from various users is similar to PON sharing and the LT (Line Termination) DSLAM or other similar upstream device performs the assignment of DSL dimensions. Using such a multiple loop system, an overall bandwidth of 50 Gbps can be realized in each direction for a system with approximately 2000 loops. In such a system for a 1 km range, no user experiences less than 50 Mbps and typically has available several 100 Mbps.

The individual users are coupled to a given multiple-loop segment using a multiple loop junction tap. As seen in the example of FIG. 3, where 4 loops make up multiple-loop segment 312, each "tapped in" user 310-2 can be coupled to the multiple loop segment 312 using junction 320 that allows a multiple loop junction tap 320 to be set up for a user. Such junctions can be as simple as wires/loops screwed or clamped into the desired multiple-loop segment. The typical location for such a junction is the pedestal 130. Other ways to couple users to the multiple-loop segments may also be used. In the example of FIG. 3, a PVU 324 in LT DSL device 334 can operate in a manner similar to that of PVU 224 of FIG. 2.

Each multiple-loop segment may have a single reference wire or multiple reference wires, depending on the desired performance characteristics of the system and available bandwidth for users' access. Thus, in an 8 wire, bonded multiple-loop segment, there may be a single reference wire and 7 available transmission wires (that is, data bearing wires acting as channels), 2 reference wires and 6 available transmission wires (that is, channels), etc. The multiple loop junction tap going to a given user's DSL equipment will take into account the number and function (for example, transmission wire or reference wire) of the wires to which the junction tap is connected.

In the embodiment shown in FIG. 3, each of the loops is connected to a transceiver 324 at the LT DSL 334, and also to at least one transceiver corresponding to one of the users 310-2 or 310-4. This means that more than two transceivers may be connected to a single loop. This approach means that there can be more than two transmitters and more than two receivers present on a single twisted pair. Transmission and reception of signals in such an environment presents several challenges, and methods to overcome these challenges are next described.

Each of the "taps" 320 connecting a loop segment 314 or 312 to a user 310-2 or 310-4 affects the transmission channel. A signal propagating on a twisted pair and encountering a junction 320 is divided into three components: a first part is reflected and starts traveling in the opposite direction, a second part continues traveling on the first connected loop segment and a third part continues traveling on the second connected loop segment. Such effects cause degradation in the signal that is received by the intended recipient.

This degradation is magnified if one of the wires is not terminated at the transceivers of LT DSL 334 or the transceivers of the users 310-2 or 310-4. Such lack of proper termination results in signals being strongly reflected, which can lead to strong undesired interference (also known as "echo"). For example, suppose that the pairs of the left-most user 310-4 are not properly connected to the user's equipment (e.g. the equipment has been turned off). This means that signals transmitted by the right-most user 310-4 may be reflected and travel back to this user's receiver. The receiver may then encounter strong interference from this echo, and its performance may be affected.

The above problem can be mitigated by the following procedure. The condition of one or more improperly terminated pairs can be detected by either the LT DSL 334, or by the user equipment 310-2 or 310-4. Detecting this condition can be achieved by either transmitting a probing signal and measuring the received reflection signal, or by measuring the channel insertion loss at different frequencies between the LT DSL 334 and one of the users 310-2/310-4, to identify patterns indicative of improperly terminated pairs.

After such a condition is detected, one or more of the following steps can be taken: a) The LT DSL 334 and the user equipment 310-2 may change their transmission parameters to take into account the effects of the improper termination. The change in the transmission parameters would be such that frequencies with strong echo interference or frequencies with increased channel attenuation are used less heavily for information transmission (e.g. by reducing the number of bits assigned to the corresponding tones); b) the LT DSL 334 may change its source or load impedance and the user equipment 310-2 or 310-4 may change its source or load impedance to mitigate the impact of the improper termination.

In one embodiment, a table-based approach is used, where each table row corresponds to a scenario of improper termination. The number of such scenarios is limited, because each scenario corresponds to a discrete event of one of the users being improperly connected to a pair. The table elements will include pre-computed transmission parameters (e.g. bit and power assignment per frequency, equalizer settings, coding parameters, impedance settings, analog front end settings) that are optimum for the scenario of the row.

A signal transmitted by the LT DSL 334 will be received by all users 310-2 to 310-4 but with a varying degree of degradation (e.g. attenuation and dispersion). In most situations, users that are located the furthest from the LT DSL will have signals received with the most degradation. External noise may also affect the different users in different ways, so it is expected that a downstream transmission on the same pair will be characterized by different signal-to-noise ratios (SNR) at each of the users 310-2/310-4. The situation is similar for upstream: Upstream transmissions on the same pair from the users 310-2/310-4 to the LT DSL 334 will have differing receiver SNR depending on the source (one of the users 310-2/310-4).

In a less complex embodiment, the transmitter of LT DSL 334 will adjust its transmission parameters (e.g. bit and power assignment per frequency, forward error correction coding parameters), so that the transmitted signal can be reliably decoded by the user with the worst channel and noise conditions (e.g. the user with the worst SNR). In this case, the signal transmitted in the downstream direction contains a single stream of downstream traffic. The signal is decoded by all users, and the traffic is "seen" by all. However, each user only continues to read those traffic packets that are addressed to it and discards packets that are destined for other users. In a preferred embodiment, encryption is applied to prevent unintended eavesdropping.

Transmitting in the upstream direction presents the challenge of "collisions" because of potential attempts of multiple users to transmit at the same time. To prevent such collisions, the LT DSL can control the times at which the users transmit in the upstream direction. The LT DSL may send control signals to the individual users. Each such control signal grants permission to a user to use a defined interval of time for upstream transmission. The LT DSL may send such control signals and may reassign its allocation of time to the users every few milliseconds. The LT DSL may thus allocate bandwidth to all users in a timely manner according to the service needs and priorities. This solution is also similar to the one adopted in passive optical networks for solving the problem of upstream bandwidth allocation. Note that this solution works better if all the users are synchronized, which can be achieved, for example, using the synchronous mode defined in the VDSL2 recommendation (ITU-T G.993.2), and also known as the "zipper" technique in the literature. However, other techniques may be used instead, depending on the circumstances.

In alternative embodiments, the downstream transmission is such that only part of the signal is decoded by each user. When Frequency-Division-Multiple-Access (FDMA) techniques are used, different frequencies of the transmitted signal convey information for different users. In this case, the signal is not fully decoded by all users. In such a scheme, it is advantageous to assign low frequencies to users that are located the furthest from the LT DSL and high frequencies to users that are located the closest to the LT DSL. Time-Division-Multiple-Access (TDMA) can also be used, where the users only decode the signal at allocated times. Multi-user techniques involving concepts of cloud-decoding, sphere decoding, and broadcast transmission may also be applied.

In other embodiments, the upstream transmission can be such that users can transmit simultaneously. Collisions can be avoided by proper separation of the transmissions either in frequency (FDMA) or in time (TDMA). Multi-user receiver techniques involving successive decoding may also be possible. In these alternative approaches, a DSL Optimizer can manage the allocation of the available resources based on the service needs.

The allocation of bandwidth by the LT DSL to individual users becomes more complicated in the presence of bursty data traffic (e.g. web browsing, Internet-Protocol Tele-Vision, IPTV). Such traffic is improved by dynamically taking into account the sudden increases in bandwidth needs experienced by the users. Such techniques are known as dynamic bandwidth allocation (DBA) in the context of PON.

In a preferred embodiment, a logical connection between a user and the LT DSL is characterized by a priority or a traffic class. (Such a logical connection is described as a Traffic Container or T-CONT in PON.) There can be multiple such logical connections for each user (e.g. one for low-priority interne traffic, or one for high-priority video traffic). The LT DSL may poll each of users for the backlog or the queue size corresponding to each logical connection. The LT DSL then knows the queue sizes experienced by all users and also knows the relative priorities of each connection for each user. Based on this information the LT DSL can then allocate transmission bandwidth to the users.

There are several methods that can be used for DBA. One such method is Weighted Round Robin (WRR), where each logical connection is assigned a "weight" to characterize its priority level. WRR is a modified version of the Round-Robin (RR) method for resource allocation, where each of the logical connections is given time to transmit in a round-robin fashion. However, a higher weight means that a logical connection is allocated relatively more time for such transmissions.

An alternative method is the use of a priority queue. With such a scheme, each logical connection is assigned a priority level. A priority queue is used, which operates such that time is first allocated to the logical connections with the highest priority level. Yet another most-efficient method is Queue Proportional Scheduling (QPS) where the user data rates scale with their associated queue depths.

Figure 4A:
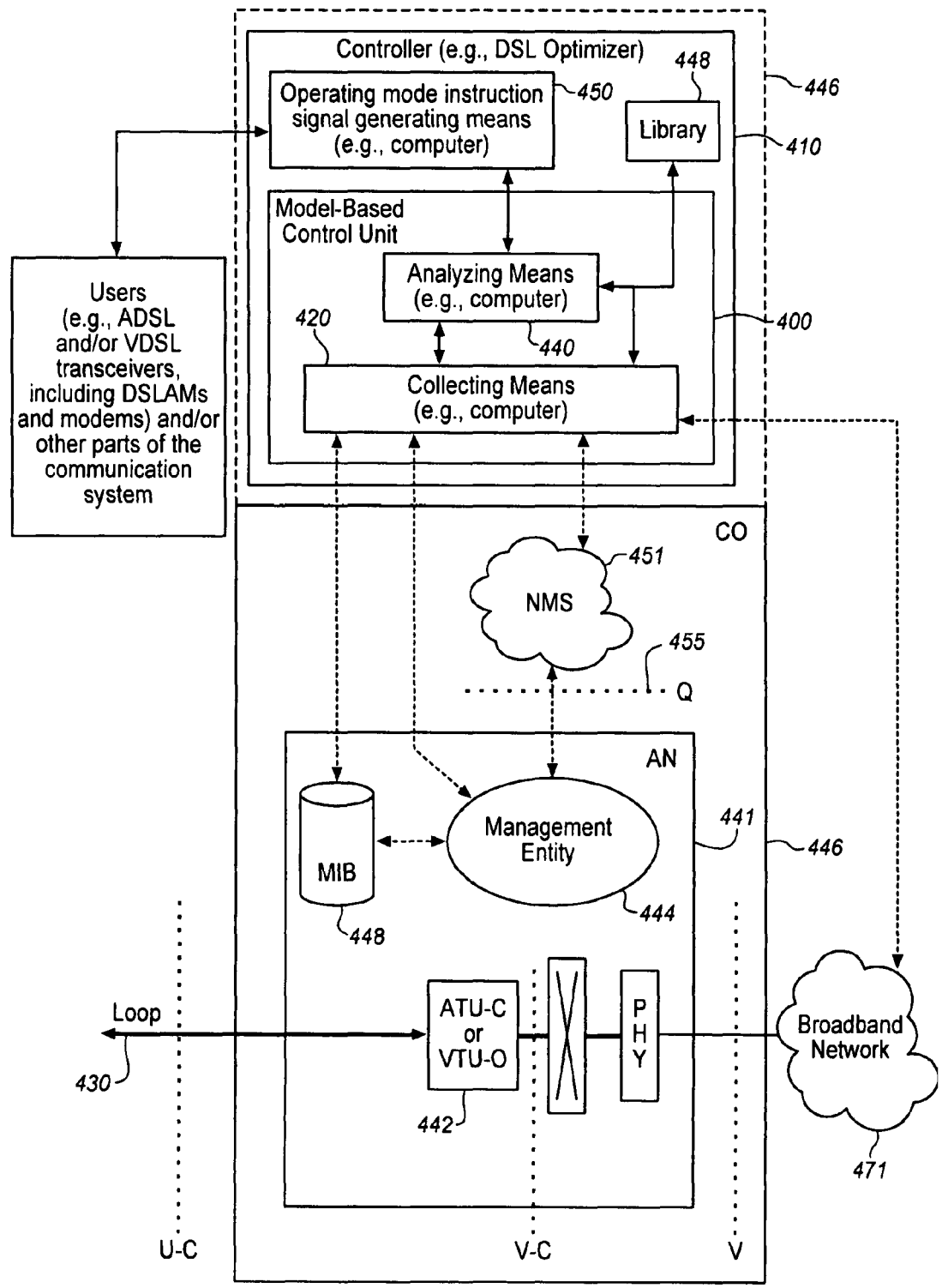
FIG. 4A is a block diagram of an example DSL controller architecture according to an embodiment of the present invention.
Figure 4B:
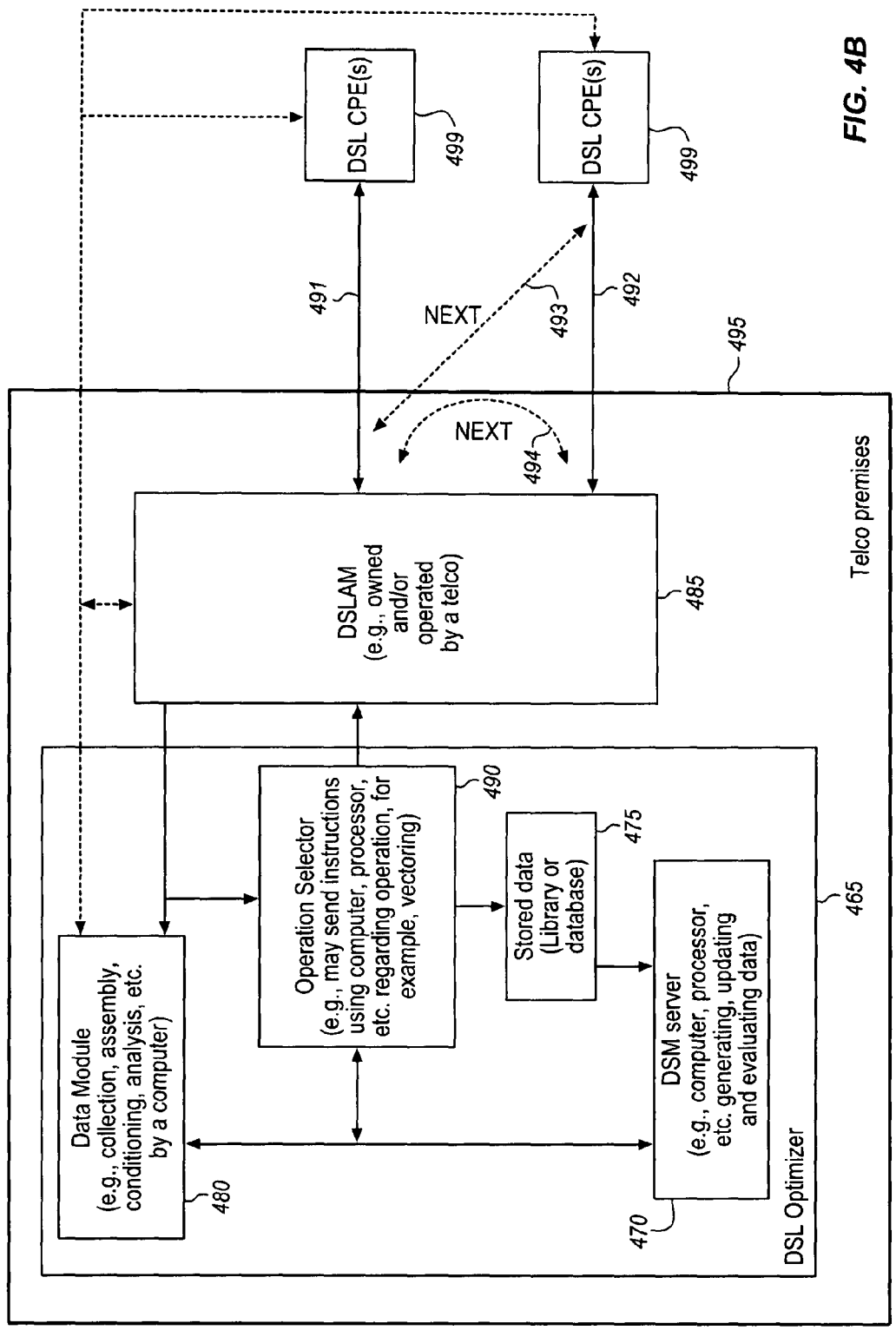
FIG. 4B is a block diagram of an alternative DSL controller architecture according to an embodiment of the present invention.

The controller used in embodiments of the present invention can be of any suitable configuration. Several examples are shown in FIGS. 4A and 4B. According to one embodiment of the present invention shown in FIG. 4A, a control unit 400 may be part of an independent entity coupled to a DSL system, such as a controller 410 (for example, a device functioning as or with a DSL optimizer, DSM server, DSM Center or a dynamic spectrum manager) assisting users and/or one or more system operators or providers in operating and, perhaps, optimizing use of the system. (A DSL optimizer may also be referred to as a dynamic spectrum manager, Dynamic Spectrum Management Center, DSM Center, System Maintenance Center or SMC.)

In some embodiments of the invention, the controller 410 may be a completely independent entity, while in other embodiments the controller 410 may be an ILEC (Incumbent Local Exchange Carrier) or CLEC (Competitive Local Exchange Carrier) operating a number of DSL lines from a CO or other location. As seen from the dashed line 446 in FIG. 4A, the controller 410 may be in the CO 446 or may be external and independent of CO 446 and any company operating within the system. Moreover, controller 410 may be coupled to and/or controlling DSL and/or other communication lines in multiple COs.

The control unit 400 includes a data collection unit 420 identified as a collecting means and an analysis unit 440 identified as an analyzing means. As seen in FIG. 4A, the collecting means 420 (which can be a computer, processor, IC, computer module, etc.) may be coupled to NMS 451, ME 444 at AN 441 and/or the MIB 448 maintained by ME 444, any or all of which may be part of an ADSL and/or VDSL system for example. Data also may be collected through the broadband network 471 (for example, via the TCP/IP protocol or other protocol or means outside the normal internal data communication within a given DSL system).

One or more of these connections allows control unit 400 to collect operational data from the system and, if appropriate, elsewhere. Data may be collected once or over time. In some cases, the collecting means 420 will collect on a periodic basis, though it also can collect data on demand or any other non-periodic basis (for example, when a DSLAM or other component sends data to the control unit), thus allowing the control unit 400 to update its information, operation, etc., if desired. Data collected by means 420 is provided to the analyzing means 440 (which also can be a computer, processor, IC, computer module, etc.) for analysis and any decision regarding operation of one or more DSL systems, including multiple-loop segments and/or multiple loop junction taps and their users.

In the exemplary system of FIG. 4A, the analyzing means 440 is coupled to a signal generating means 450 in the controller 410. This signal generator 450 (which can be a computer, processor, IC, computer module, etc.) is configured to generate and send instruction signals to modems and/or other components of the communication system (for example, ADSL and/or VDSL transceivers and/or other equipment, components, etc. in the system). These instructions may include instructions regarding data rates, transmit power levels, coding and latency requirements, retraining scheduling and implementation, system configuration instructions, reference and transmission wire usage, frequency usage, time-slot assignments, etc. The instructions may be generated after the controller 410 determines a basis for configuring and/or controlling operation of a communication system coupled to the controller 410.

Embodiments of the present invention can use a database, library or other collection of data pertaining to the data collected, previously collected data, etc. This collection of reference data may be stored, for example, as a library 448 in the controller 410 of FIG. 4A and used by the analyzing means 440 and/or collecting means 420. In some embodiments of the present invention, control unit 400 may be implemented in one or more computers such as PCs, workstations or the like and/or in one or more computer program products. The collecting means 420 and analyzing means 440 may be software modules, hardware modules or a combination of both. When working with a large numbers of modems, lines, users, etc., databases may be introduced and used to manage the volume of data collected.

Another embodiment of the present invention is shown in FIG. 4B. A DSL optimizer 465 operates on and/or in connection with a DSLAM 485 or other DSL system component (for example, an RT, ONU/LT, etc.), either or both of which may be on the premises 495 of a telecommunication company (a "telco"). The DSL optimizer 465 includes a data module 480, which can collect, assemble, condition, manipulate and/or supply operational data for and to the DSL optimizer 465. Module 480 can be implemented in one or more computers such as PCs or the like. Data from module 480 is supplied to a DSM server module 470 for analysis (for example, determining the availability and reliability of operational data, collected data for given communication lines, control and operational changes to the communication system, etc.). Information also may be available from a library or database 475 that may be related or unrelated to the telco.

An operation selector 490 may be used to implement signals affecting operation of the communication system. Such decisions may be made by the DSM server 470 or by any other suitable manner. Operational modes selected by selector 490 are implemented in the DSLAM 485 and/or any other appropriate DSL system component equipment. Such equipment may be coupled to DSL equipment such as customer premises equipment 499. Device 485 can be used to implement any changes ordered by the DSL optimizer 465. The system of FIG. 4B can operate in ways analogous to the system of FIG. 4A, although differences are achievable while still implementing embodiments of the present invention.

The Controller or DSL Optimizer of FIGS. 4A and 4B may be used in the management of a system such as the one described in FIG. 3. Such a Controller or DSL Optimizer can have knowledge of traffic needs and traffic priorities, which may be provided to it externally through Operations Support Systems (OSS), or other management systems of a telco (telephone company) or service provider. Such a Controller or DSL Optimizer can also track traffic statistics corresponding to each user and to each logical connection, analyze these statistics and report to OSS systems of the service provider. Finally, the Controller or DSL Optimizer may adjust priorities and traffic classes of the system presented in FIG. 3.

Such adjustments can be performed using interfaces that are similar to those defined, for example, in ITU-T G.984.4 ("Gigabit-capable Passive Optical Networks: ONT management and control interface specification"), although other interfaces may be used instead. A Traffic Container (T-CONT) may be defined to characterize a logical connection between a user and the LT DSL, and such a T-CONT can be configured by a DSL Optimizer. The DSL Optimizer can configure parameters of the T-CONT such as queue configuration options, maximum queue size, threshold values for discarding packets caused by buffer overflow, weights for WRR, back pressure operation options and others.

Figure 5:
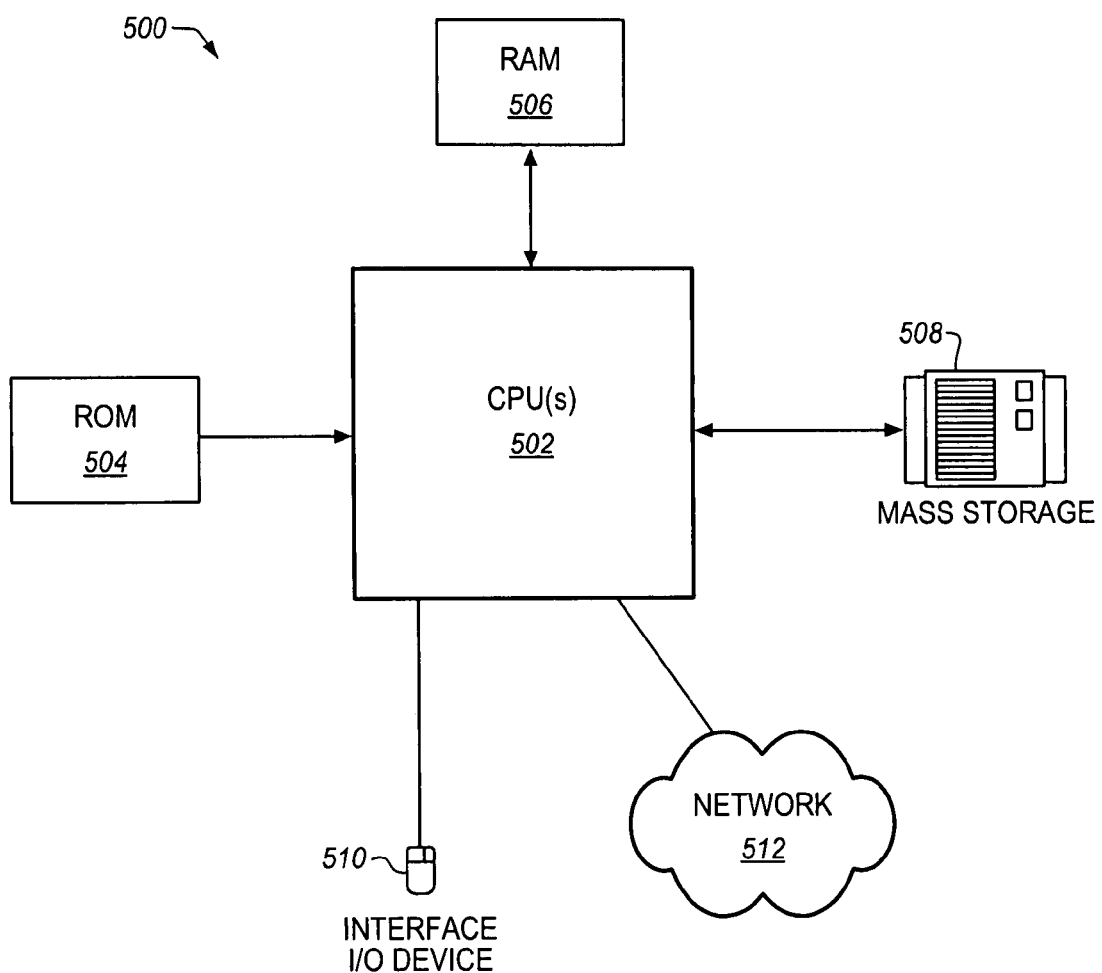
FIG. 5 is a block diagram of a typical computer system suitable for implementing embodiments of the present invention.

FIG. 5 illustrates a typical computer system that can be used by a user and/or controller in accordance with one or more embodiments of the present invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). The CPU and some of the components of system 500 may also be implemented as an integrated circuit or chip that is a single device capable of being used in embodiments of the present invention.

Primary storage 504 acts to transfer data and instructions uni-directionally to the CPU and primary storage 506 is used typically to transfer data and instructions in a bi-directional manner. Both of these primary storage devices may include any suitable of the computer-readable media described above. A mass storage device 508 also is coupled bi-directionally to CPU 502 and provides additional data storage capacity and may include any of the computer-readable media described above. The mass storage device 508 may be used to store programs, data and the like and is typically a secondary storage medium such as a hard disk that is slower than primary storage. The information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 also is coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other input devices such as other computers. Finally, CPU 502 optionally may be coupled to a computer or telecommunications network using a network connection as shown generally at 512. With such a network connection, it is contemplated that the CPU, might receive information from the network, or might output information to the network in the course of performing the above-described method steps. The hardware elements described above may define multiple software modules for performing the operations of this invention. For example, instructions for running a codeword composition controller may be stored on mass storage device 508 or 514 and executed on CPU 502 in conjunction with primary memory 506. In a preferred embodiment, the controller is divided into software submodules.

Figure 6:
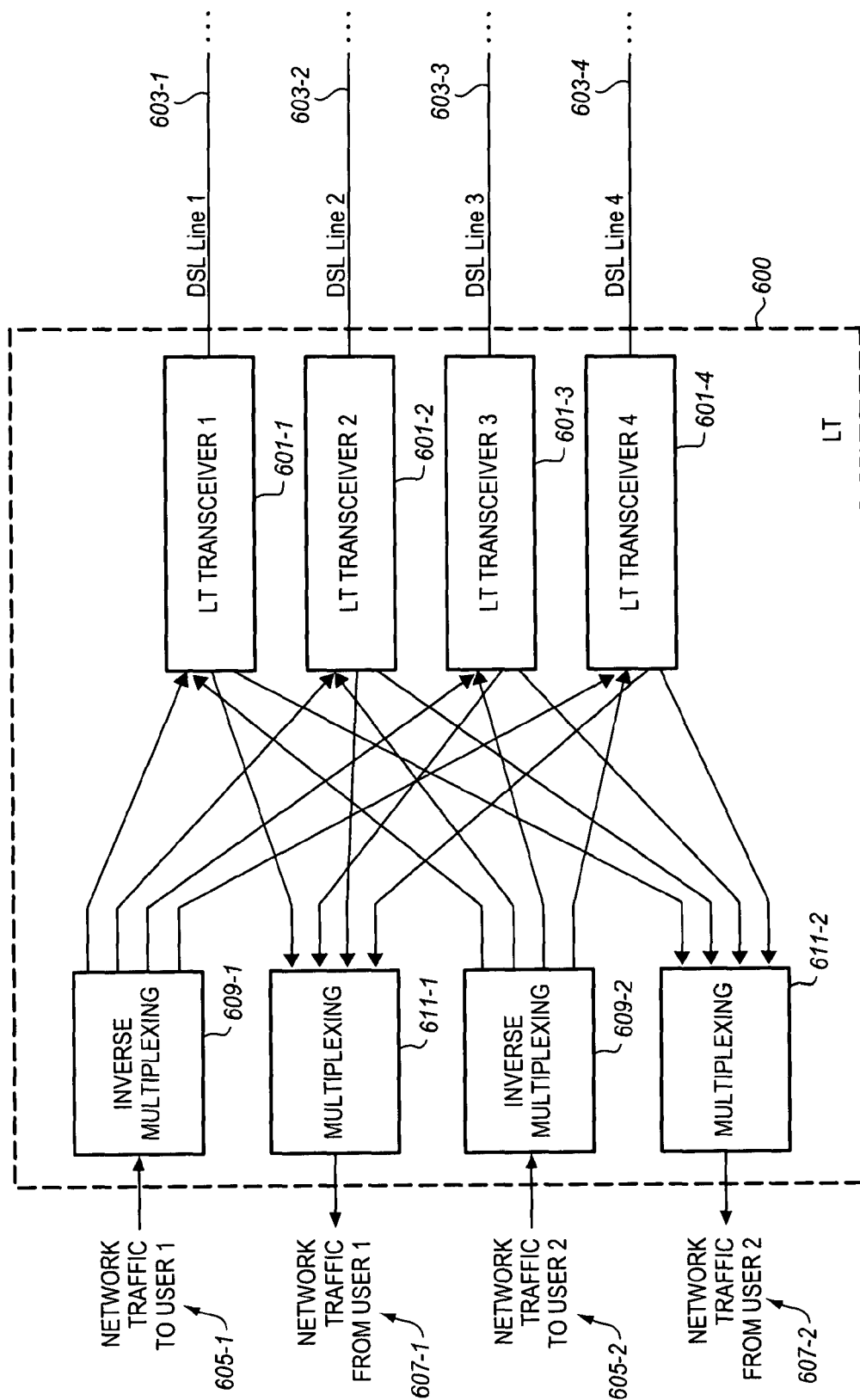
FIG. 6 is a block diagram of a portion of a DSL LT suitable for use with embodiments of the present invention.

FIG. 6 shows an example of a portion 600 of a DSL LT, such as the DSL LT 334 of FIG. 3 suitable for use with embodiments of the present invention. The LT is coupled to four DSL loops 603-1 to 603-4 through which DSL data is sent to CPEs and received from CPEs. As mentioned above, the loops are used together as a multiple-loop segment and all four loops are shared among the different CPEs. The number of loops may be adapted to suit the circumstances. Four loops are shown for illustration purposes only. Each loop is coupled to one LT transceiver 601-1 to 601-4, respectively.

On the other side, the LT is coupled to network traffic. In the example of FIG. 6, two users are served. Accordingly, there is received network traffic 605-1 to be sent to the first user and a second stream or sequence of received network traffic 605-2 to be sent to the second user. Similarly, there is a connection 607-1 for network traffic from the first user to be sent to the network and a connection 607-2 for network traffic from the second user to be sent to the network.

The first user's incoming traffic is applied to an inverse multiplexer 609-1 in the LT to divide the received data into separated demultiplexed traffic. The inverse multiplexer converts the data from the network format, for example, Ethernet, ATM, or Frame Relay, to a format that is suitable for transmission through the multiple-loop segment of DSL lines. This includes separating traffic addressed to the first user from all of the other traffic. The inverse multiplexer is coupled to the LT transceiver for each of the DSL lines, so that the data may be sent on any one or more of the DSL lines.

Similarly, the first user's outgoing traffic from each of the DSL lines is coupled to a multiplexer 611-1. The multiplexer collects data from the multiple-loop segments, combines it together, and converts it to a format that is appropriate for network traffic.

A similar inverse multiplexer 609-2 for the second user is coupled to the second user's incoming traffic 605-2 and to each of the transceivers 601. A similar multiplexer 611-2 for the second user receives traffic from the LT transceivers 601, multiplexes it and sends it out to the network 607-2.

Potential embodiments of multiplexing and inverse multiplexing operations in modules 609 and 611 are described, for example, in ITU-T Recommendations for "DSL Bonding". ITU-T Recommendation G.998.1 describes ATM-based Multi-pair Bonding, ITU-T Recommendation G.998.2 describes Ethernet-based Multi-pair Bonding and ITU-T Recommendation G.998.3 describes Multi-pair Bonding using Time-Division Inverse Multiplexing. Techniques to perform bonding are thus known to those skilled in the art, and they can be directly applied to the multiplexing and inverse multiplexing operations of 609 and 611 to correspondingly: a) decompose a single data stream on multiple data streams to be transmitted on a plurality of DSL lines, and b) combine multiple data streams received on a plurality of DSL lines to re-create a single data stream.

LT transceivers 601 may be coupled to perform vectoring operations, as shown in FIG. 2 for the PVU 224.

Figure 7:
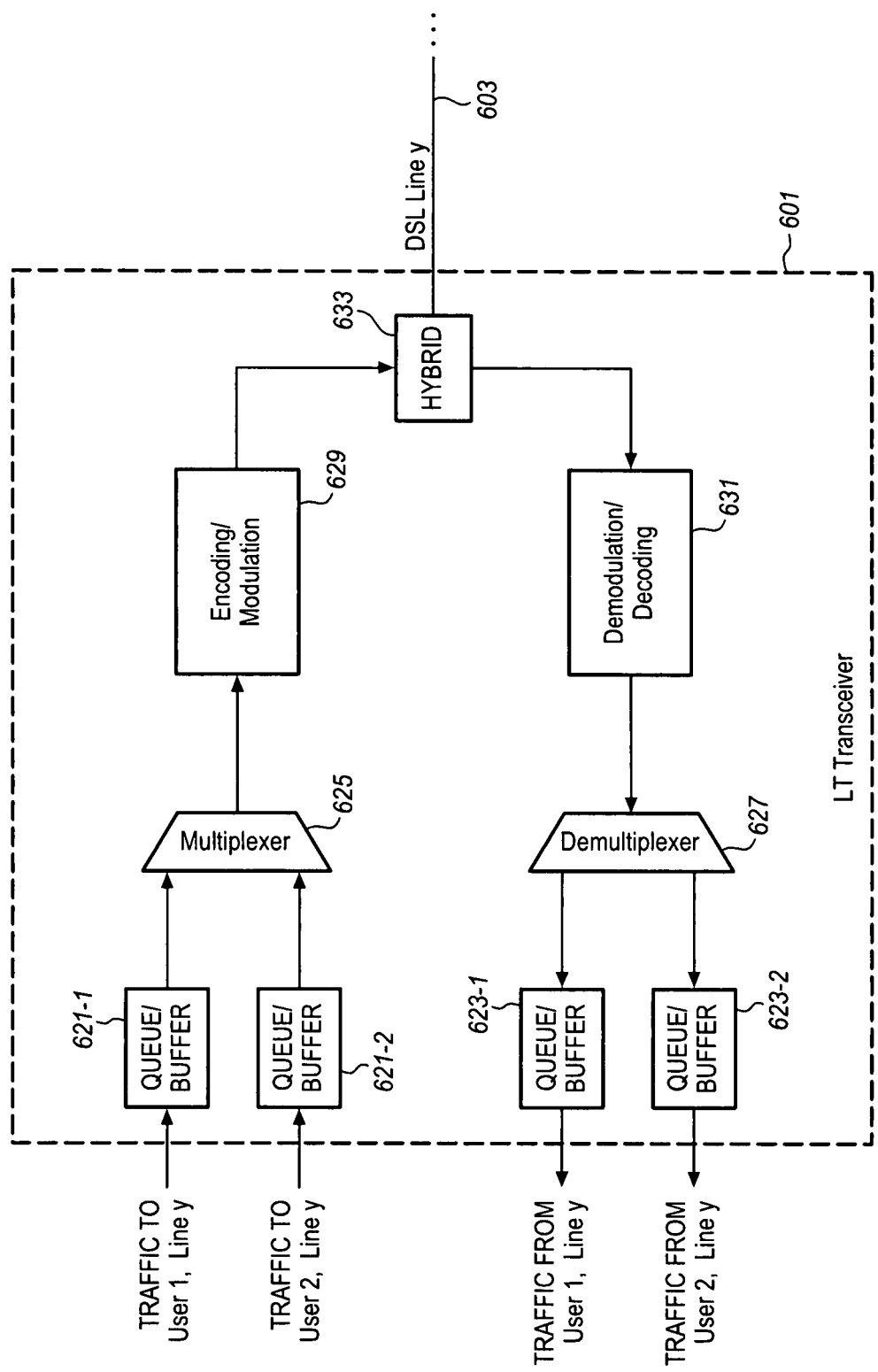
FIG. 7 is a block diagram of an LT transceiver of FIG. 6 suitable for use with embodiments of the present invention.

FIG. 7 shows an example of an LT transceiver 601 in more detail. The two data input lines, one for the first user and one for the second user are each applied to a respective buffer or queue 621-1, 621-2. The buffers collect the traffic and may place it in a respective queue to await further processing. The data from the two buffers is applied to a multiplexer 625 that combines the two sources of data into one sequence. The multiplexer, in some embodiments, can form the data into appropriately sized packets, apply headers and footers, synchronization or any other desired identifiers to the data. The multiplexed data is then encoded and modulated 629 and applied to a hybrid 633 to be transmitted over the coupled DSL line 603.

With respect to the connected DSL line 603, the buffers 621, multiplexer 625, encoder/modulator 629 and hybrid from a transmit chain. The multiplexer takes the transmit data for the two users and combines them into a single bitstream that can be transmitted onto the single DSL loop 603. This can be done in a variety of different ways. In one example, the multiplexer first selects a packet from one of the queues, encrypts the packet, if encryption is being used, attaches a header, footer or other identifier to mark the packet as being directed to the appropriate user, and then provides the packet to the encoder/modulator 629.

To select a packet from one of the queues, any of a variety of different approaches can be used. In the current example of only two users, a simple approach can be used. However, if there are more users, there can be significant advantages to applying priority and weighting schemes to packet selection. In a simple approach for two users, the multiplexer can simply alternate between the two queues. When one queue is empty, it will skip that queue and send only packets from the queue that has data to send. When both queues are empty, dummy packets or other types of packets can be sent. A round robin approach can also be used. This can be weighted in favor or higher priority packets, such as voice or streaming applications, or higher paying or higher priority, such as emergency services customers. Alternatively, the longest queue can receive priority.

A multiplexer 625 or demultiplexer 627 can also be implemented as described, for example, in the ITU-T Recommendation G.993.2 (VDSL2), "Transport Protocol Specific Transmission Convergence (TPS-TC) function". This recommendation contains a description for a module where user data from multiple channels are provided through "User application interfaces" at the so-called "gamma interface". The recommendation specifies protocols to be used to combine the user data from the multiple channels into a data stream to be provided to the "Physical Medium Specific Transmission Convergence (PMS-TC) function at the so-called "alpha/beta interface". The user data from multiple channels may correspond to the Traffic to User 1, User 2 shown FIG. 7.

The output of the multiplexer 625 may correspond to the "alpha/beta interface". Inversely, the recommendation also specifies protocols to be used for decomposing a single data stream from the PMS-TC function into user data for multiple channels. Such protocols can be used for the implementation of the demultiplexer 627.

In the receive chain, data is received through the DSL line 603 at the hybrid 633 and applied to the demodulation and decoding module 631 to be converted to a baseband bit stream. This data is then applied to a demultiplexer 627 which sends data from the first user into a first buffer 623-1 and the data from the second user into a second buffer 623-2. From the appropriate buffer 623, the data can be transmitted out to the network as appropriate for the particular network interface.

The demultiplexer 627 in the receive chain receives the demodulated and decoded packets and then determines which user sent the packet. If encryption is used, it can also decrypt the packets before providing the packets to either the user 1 buffer 623-1 or the user 2 buffer 623-2. The best approach to choosing the right buffer will depend on how the packets are sent from the CPEs of the respective users. If the packets are identified or marked with headers, footers, coding or in some other way, then the demultiplexer can use the identification or marking to route the packet to the appropriate queue. In another embodiment, the packet may be received according to a particular time assignment. The receipt time of the packet can then be compared to a table of time slot assignments or sequential transmission assignments to determine the appropriate queue.

Figure 8:
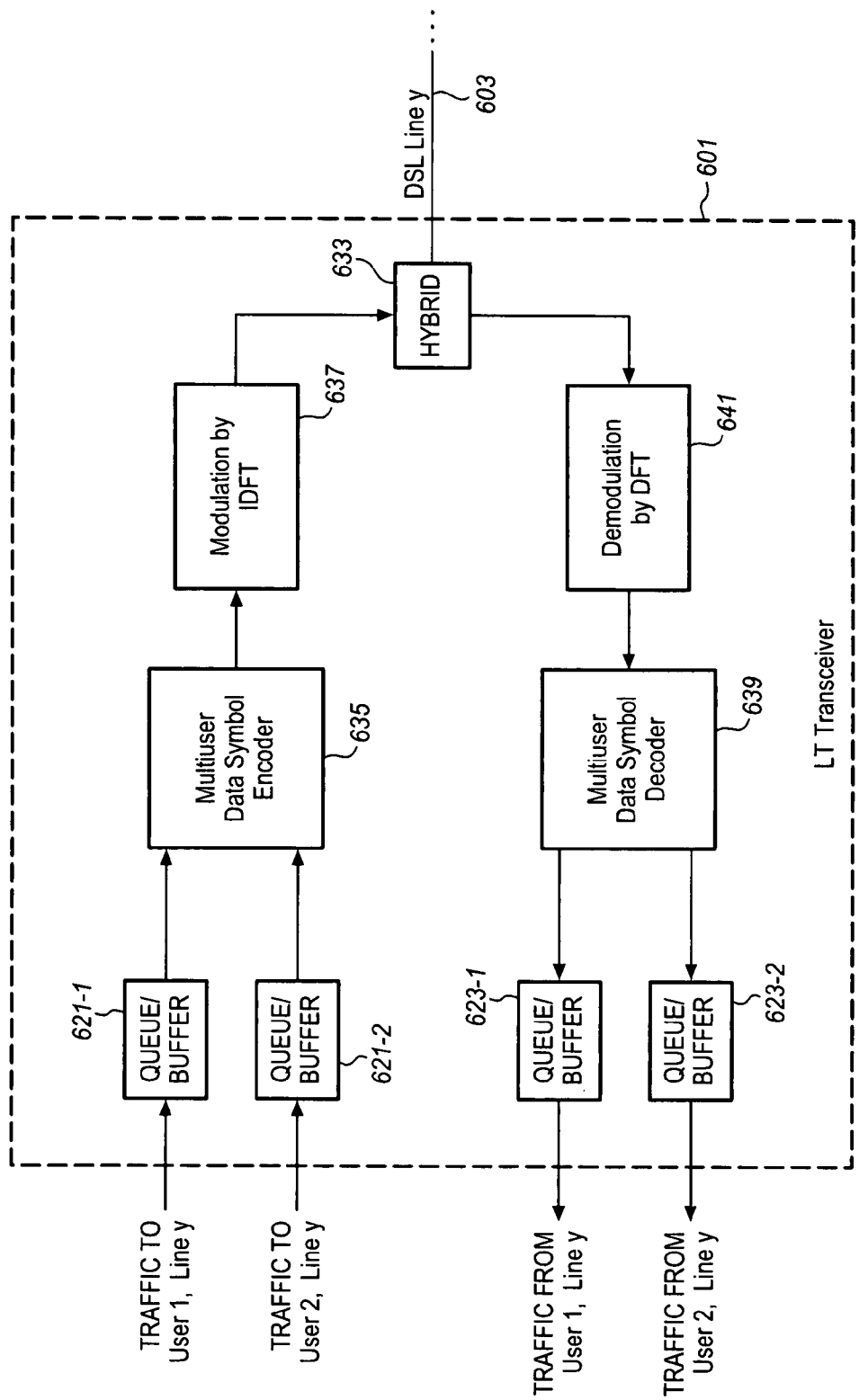
FIG. 8 is a block diagram of an alternative configuration for the LT transceiver of FIG. 6 suitable for use with embodiments of the present invention.

FIG. 8 shows an alternative configuration for the LT transceiver 601 of FIG. 6. In the example of FIG. 8, data for the two users is still collected in buffers 621-1, 621-2. The encoded data is also applied to a hybrid 633 for transmission to the two users on the coupled DSL line 603. However, in this example, the buffered data from both buffers is first applied to a multiuser data symbol encoder 635 to encode the data. The encoded data is then applied to an IDFT (Inverse Discrete Fourier Transform) based modulator 637. After IDFT modulation, the data is applied to the hybrid.

Similarly, data received from the hybrid 633 that comes through the DSL line is applied to a DFT (Discrete Fourier Transform) demodulator 641. The demodulated data is then applied to a multiuser data symbol decoder 639 which separates the data from each user and applies each user's data to its own buffer 631-1, 631-2. In the buffers, the data is queued and then sent out on the network as with the example of FIG. 7.

In both FIG. 7 and FIG. 8, only two users are supported. The number of supported users can be increased by adding more inputs and outputs and more buffers. Only two users are shown in order for the figures to be more easily understood. In some circumstances, the number of users that share the multiple-loop segment can be determined based on the number of users that share a pedestal or a SAI. In other circumstances, the number of users can be determined based on the traffic demands of each user. More users will reduce the data rate for each user that is using the loops at the same time.

Figure 9:
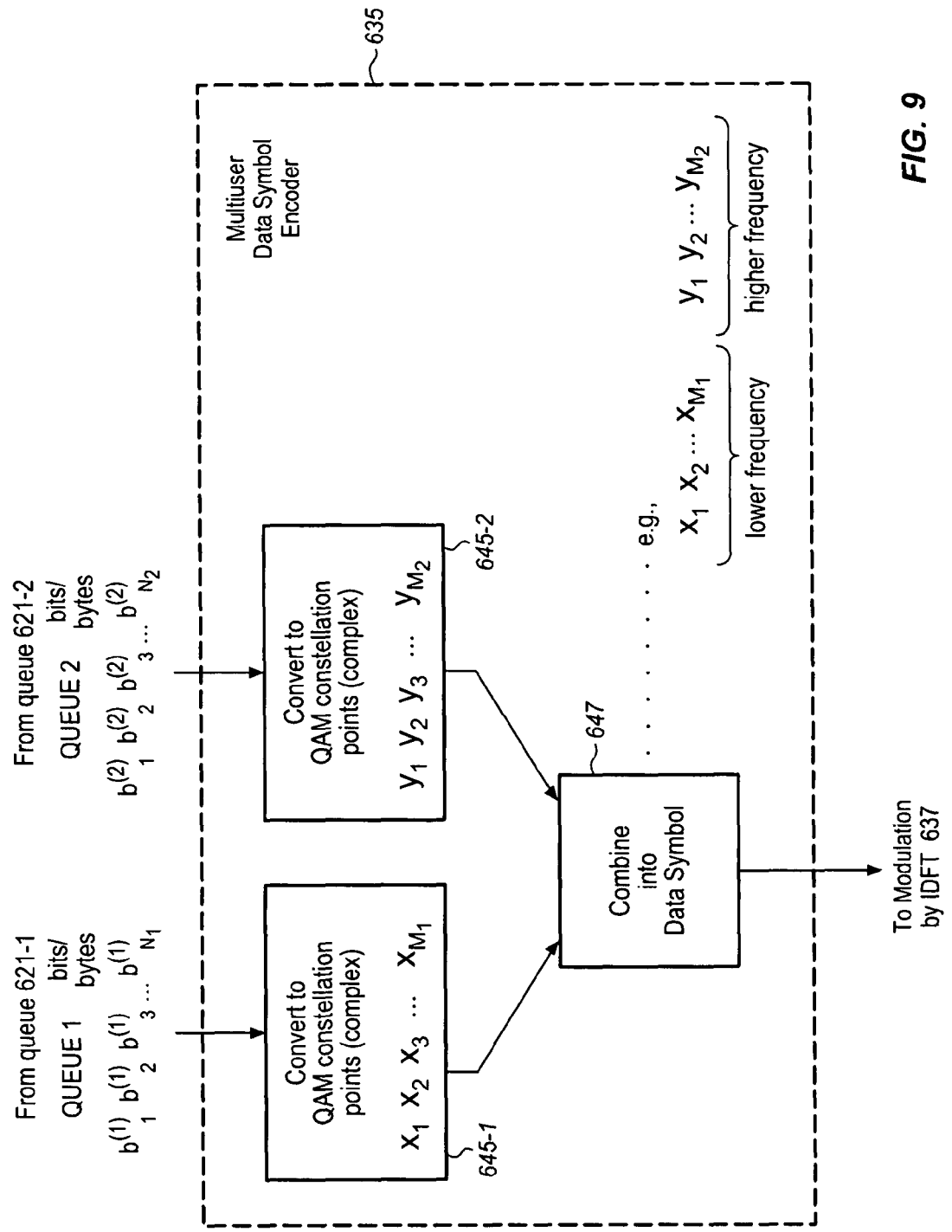
FIG. 9 is a block diagram of a multiuser data symbol encoder of FIG. 8 suitable for use with embodiments of the present invention.

FIG. 9 shows an example of the multiuser data symbol encoder 635 of FIG. 8 in more detail. As indicated, the encoder is coupled to the two queues 621-1, 621-2. While two queues are shown, more may be provided in order to support a larger number of users. The first queue provides buffered data to a first converter 645-1, which maps the data to constellation points of QAM-modulated subcarriers within a multicarrier transmission system, such as discrete multi-tone. In the illustrated example, the data from the queue comes in the form of bits or bytes with values that can be indicated as $b^{(1)}_1, b^{(1)}_2, b^{(1)}_3 \ldots b^{(1)}_N$ indicating bits (or bytes) 1 to N for user 1. These are mapped to constellation points, which in the FIG. 9 example, are in a QAM constellation and the points x are then $x_1, x_2, x_3, \ldots x_{M1}$. The constellation point values are then provided to a combination block 647 that combines the first and second user's data into symbols. The symbols are passed to the IDFT modulation 637 as indicated in FIG. 8.

For the second user, the buffered data, $b^{(2)}_1, b^{(2)}_2, b^{(2)}_3 \ldots b^{(2)}_N$ is similarly provided from the second queue 621-2 to a converter block 645-2 to be mapped to the QAM constellation. The output of the converter in this case can be indicated as $y_1, y_2, y_3, \ldots y_{M2}$. The mapped QAM constellation points are also supplied to the combiner 647, as mentioned above.

The combination can be made in a variety of different ways. In one example with just two users, the two constellation points can be combined together to be mapped into a single symbol. In other example, a first set of symbols is used for the first user and a second set of symbols is used for the second user. This first, second model can be extended to formalized time allocations as in a time division multiplexing system. In another example, where multiple tones or frequencies are used on the DSL line 603, the symbols for one user are mapped to one set of tones and the symbols for the other user are mapped onto another set of tones. This can be extended to a formalized frequency division multiplexing system. Since higher frequencies are more susceptible to attenuation, noise and interference over distance than lower frequencies, the higher frequencies can be allocated to the nearer user and the lower frequencies to the more distant user. The selection of frequency allocations can also be made using noise or signal quality measurements to determine which frequencies are best received by which users. In yet another example, the two constellation points can be combined together into a single symbol using a multi-dimensional precoder.

In the example of FIG. 9, the output of the combiner 647 is shown as a first set of symbols $x_1, x_2, x_3, \ldots x_{m1}$ at lower frequencies for the first user and a second set of symbols $y_1, y_2, y_3, \ldots y_{M2}$ for the second user at higher frequencies. In a typical situation, the first user will be closer than the second user, however, there may be other factors that determine this allocation of frequencies depending on the circumstances. In another example, both users are allocated a wide range of frequencies so that both users receive more of the benefits of a wideband DMT system.

Figure 10:
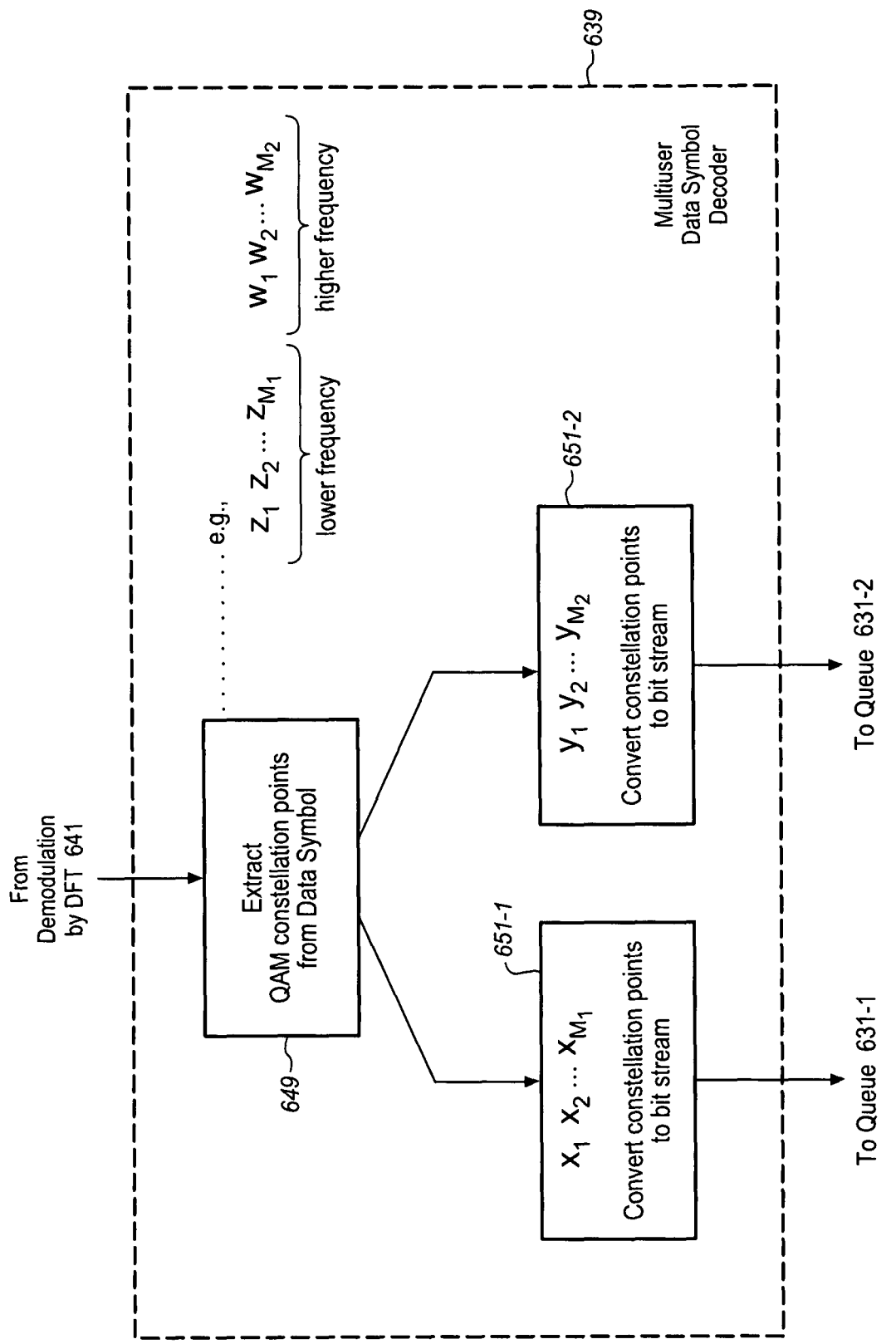
FIG. 10 is a block diagram of a multiuser data symbol decoder of FIG. 8 suitable for use with embodiments of the present invention.

FIG. 10 shows an example of the multiuser data decoder 639 of FIG. 8. Data is received after demodulation from the demodulator 641 and applied to an extraction module 649. This module extracts QAM constellation points from the received data symbol. These are indicated as being received as data points $z_1, z_2, z_3, \ldots z_{M1}$. for the lower frequency user 2 and then $w_1, w_2, w_3, \ldots w_{M2}$ for the closer higher frequency user 1. The two separate sets of constellation points are provided to respective converters 651-1, 651-2 to convert the constellation points back into bit streams. The bit streams are then applied to the queues 623-1, 623-2 for user 1 and user 2, respectively. In yet another example, the multi-user decoder is a maximum-likelihood joint decoder, or a successive decoder.

Figure 11:
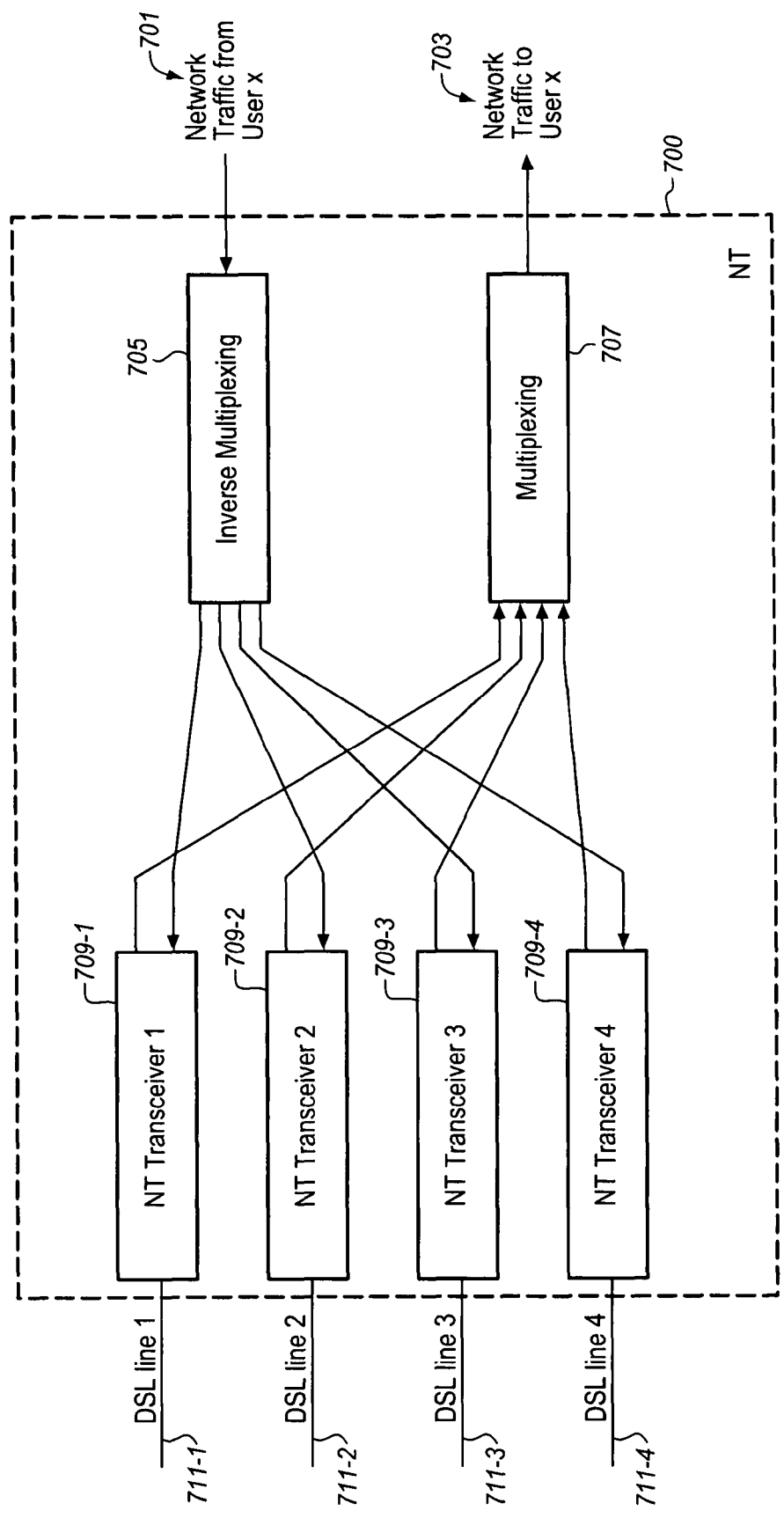
FIG. 11 is a block diagram of a portion of a DSL NT suitable for use with embodiments of the present invention.

FIG. 11 shows an example of a DSL NT (Network Termination) device 700, which can be a part of the CPE equipment or embodied in another part of the system. Such a device might be installed at a particular customer's premises, such as an office or a home to provide access to DSL data services. The device is attached to two-way network communications with a downstream channel 703 and an upstream channel 701. These channels can be coupled directly to a computer, a server, a router, or an access point. The upstream channel is coupled to an inverse multiplexer 705 to break the data into separate channels or groups and to feed the data to a set of NT transceivers 709-1, 709-2, 709-3, 709-4. In the present example, there is one transceiver for each loop 711-1, 711-2, 711-3, 711-4 of the multiple-loop DSL segment. Each transceiver is coupled directly to a loop to provide two-way communications for that loop.

Data received from each DSL loop 711 is applied to the respective transceiver 709. The transceivers are all coupled to a data multiplexer 707 which combines the four received data streams into a single sequence of data and supplies that data to the network 703. Conversely, data from the network 701 is inverse multiplexed into four data streams to be transmitted by the four transceivers 709-1, 709-2, 709-3 and 709-4. As with FIG. 6, while the number of loops in the drawings is limited to four, more or fewer loops may be used, depending upon the circumstances. Note that in FIG. 11, all four loops are coupled to the one user network. A similar NT device may be located at each customer that is coupled to the same four loops, so that the multiple-loop segment can be shared by all of the users.

NT transceivers 709 may be coupled to perform vectoring operations, as shown in FIG. 2 for CVU.

Figure 12:
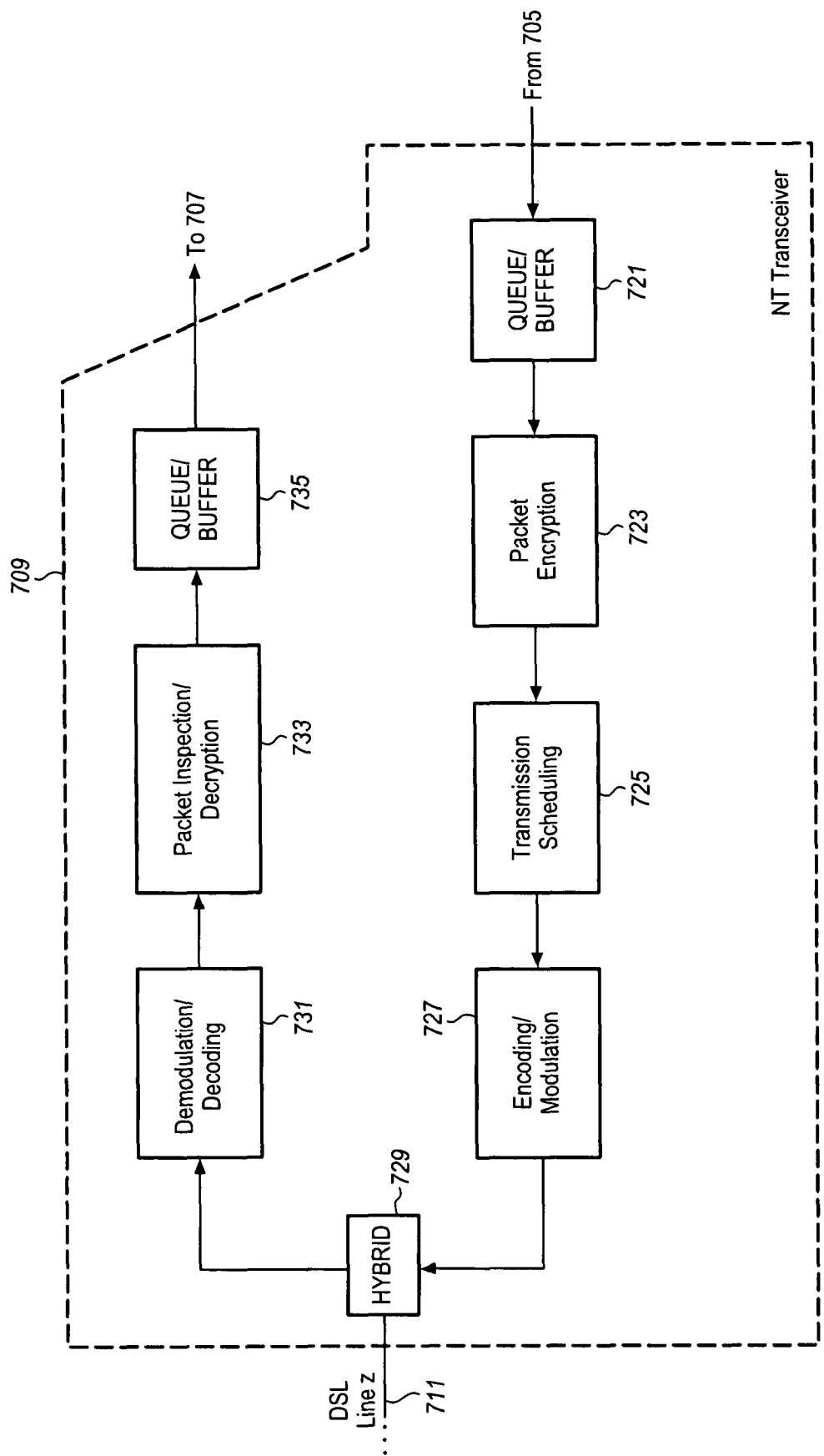
FIG. 12 is a block diagram of an NT transceiver of FIG. 11 suitable for use with embodiments of the present invention.

FIG. 12 shows an example of a transceiver 709 of FIG. 11 that can be used according to one embodiment of the invention. In FIG. 12, data from the inverse multiplexer 705 is first buffered and queued at a receive buffer 721. The data is thereby formed into packets and passed to an encryption module 723. The encrypted data is then passed to a transmission scheduler 725. These two modules, as is the case with virtually all the other modules shown and described, can be combined. The encryption module is not required and any of a variety of different types of encryption can be used depending on the particular application. Transmission scheduling is used when the transmissions from this user are to be sent at a particular time.

As mentioned above, when multiple users or customers share the multiple-loop segment, there are different ways for the transmissions from the different users to be distinguished. One way is by assigning transmit times. This corresponds to a form of time division multiplexing of the two users. In such a case, the transmission scheduler will hold the buffered data until an appropriate assigned or scheduled time and then forward the data to the encoder and modulator 727. After encoding and modulation, the data is passed to a hybrid 729 to be sent through the corresponding DSL loop 711. The transmission time can be determined, for example, by reference to a table of time slot assignments or assigned transmission times. Such a table can be sent using a control channel, such as an embedded operations channel. The table or assignments can be sent as initialization messages. The choice of how and when to send this information can be made based on the particular application.

In another embodiment, the users are distinguished by frequency. Instead of transmission scheduling, a frequency shifter can be used or the modulator can be controlled to modulate the data only onto appropriate tones or frequencies. Other modifications may be made to accommodate other schemes for distinguishing the users. Multiple approaches can also be combined.

Data received from the DSL loop 711 is passed through the hybrid 729 to a demodulation and decoding block 731. The particular nature of this block will depend upon the nature of the modulation and encoding. The decoded data can then be decrypted in a packet inspection and decryption module 733. The data can then be passed to a data queue and buffer 735. The data waits in the queue for transmission to the multiplexer 707 of FIG. 11 that allows it to then be transmitted to the customer.

In the inspection and decryption module 733, the packet will be decrypted if encryption is used and the particular nature of this operation will depend upon the type of encryption that is used. The packet inspection aspect of this module includes determining whether the packet is directed to this particular user. In one embodiment, the packet can be inspected for a header, footer, or other marker that is used to indicate the intended recipient of the packet. If the user corresponding to this CPE device is the intended recipient, then the packet can be forwarded to the queue 735. The header, footer, or marker can be stripped from the packet so that the packet better complies with the user's network configuration. On the other hand, if the packet is not intended for this user, then it is not forwarded and is instead written over by the next packet or discarded.

The packet inspection allows the CPE device to share the multiple DSL loop segment with other users without receiving packets that are not intended for it to receive. In another embodiment, the decryption process can be used to distinguish packets for this user from packets for other users. Those packets that can be successfully decrypted can be determined to be for this user. Those packets that cannot be successfully decrypted are discarded.

Figure 13:
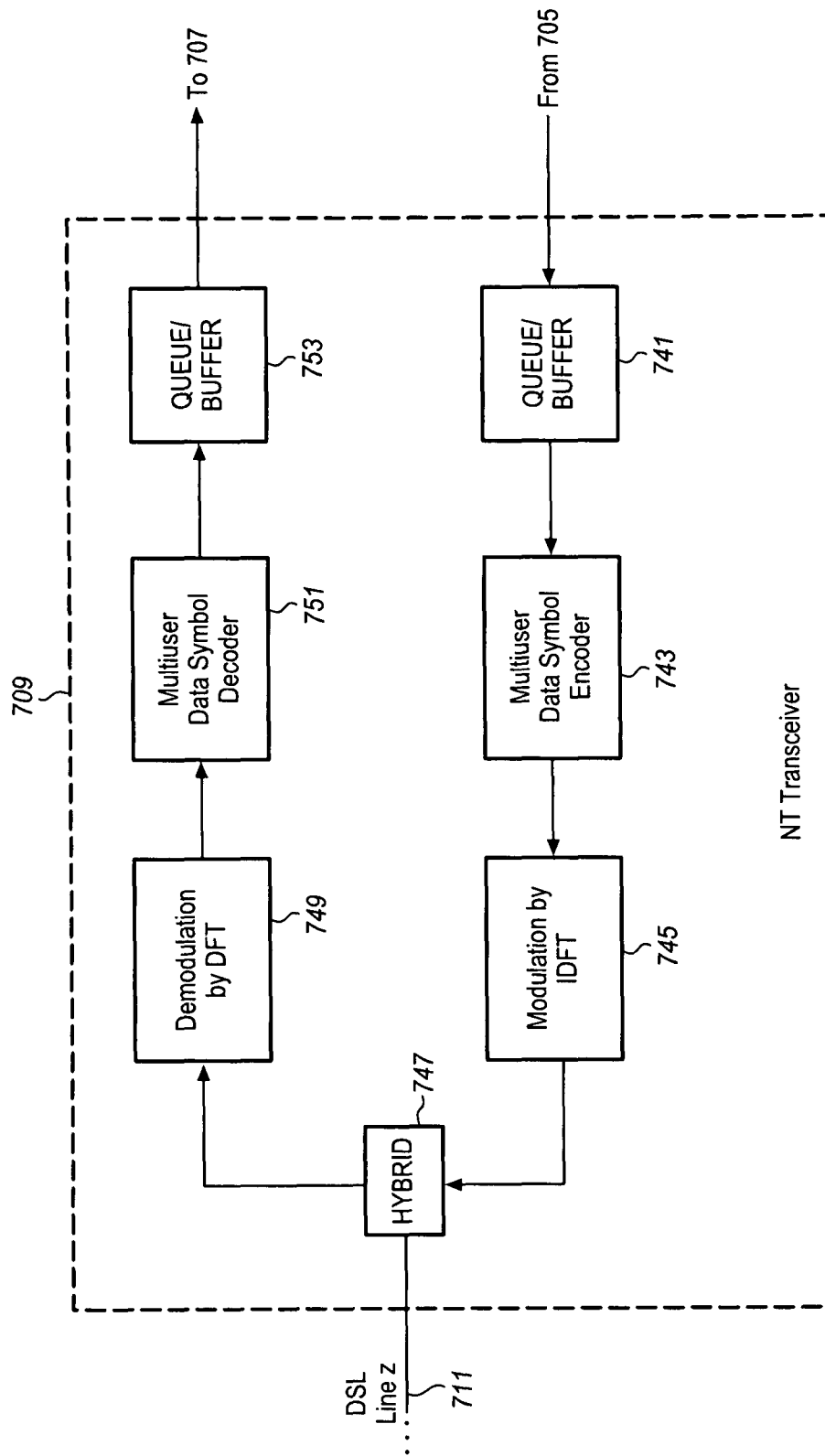
FIG. 13 is a block diagram of an alternative configuration for the NT transceiver of FIG. 11 suitable for use with embodiments of the present invention.

FIG. 13 shows an alternative approach to the transceiver 709 of FIG. 11. This transceiver supports DFT demodulation and IDFT modulation as with the examples of FIGS. 8, 9, and 10 and similar approaches and techniques are applied. For the example transceiver of FIG. 13, data is received on the DSL line 711, which corresponds to one of the loops of the multiple-loop segment. This data is conveyed through a hybrid 747 to a demodulator 749. The demodulator uses a DFT to demodulate the data similar to the approach used by the demodulator 641 of FIG. 8. The demodulated data is then sent to a multiuser data symbol decoder 751 similar to that of FIG. 10. From the decoder, the data is queued in a buffer 753 to allow it to be sent to the multiplexer 707 of FIG. 11.

In the other direction, data from the inverse multiplexer 705 is queued in a transmit buffer 741 before it is provided to a multiuser data symbol encoder 743. This encoder operates similarly to the example of FIG. 9. The encoded data is passed to a modulator 745, such as an IDFT modulator and from there through the hybrid 747 to the DSL loop.

As with the LT equipment, the NT equipment can be adapted to support any number of DSL loops and any number of simultaneous or shared users. Four loops are shown for simplicity, although it can be seen from FIG. 2 that in many cases three or seven loops may be more likely. The particular number of loops can be determined based on how many loops are available and on traffic needs. Similarly, the number of users can be determined by the number of users that are connected to a pedestal or by any other appropriate consideration. The drawings are to be treated only as examples.

Figure 14:
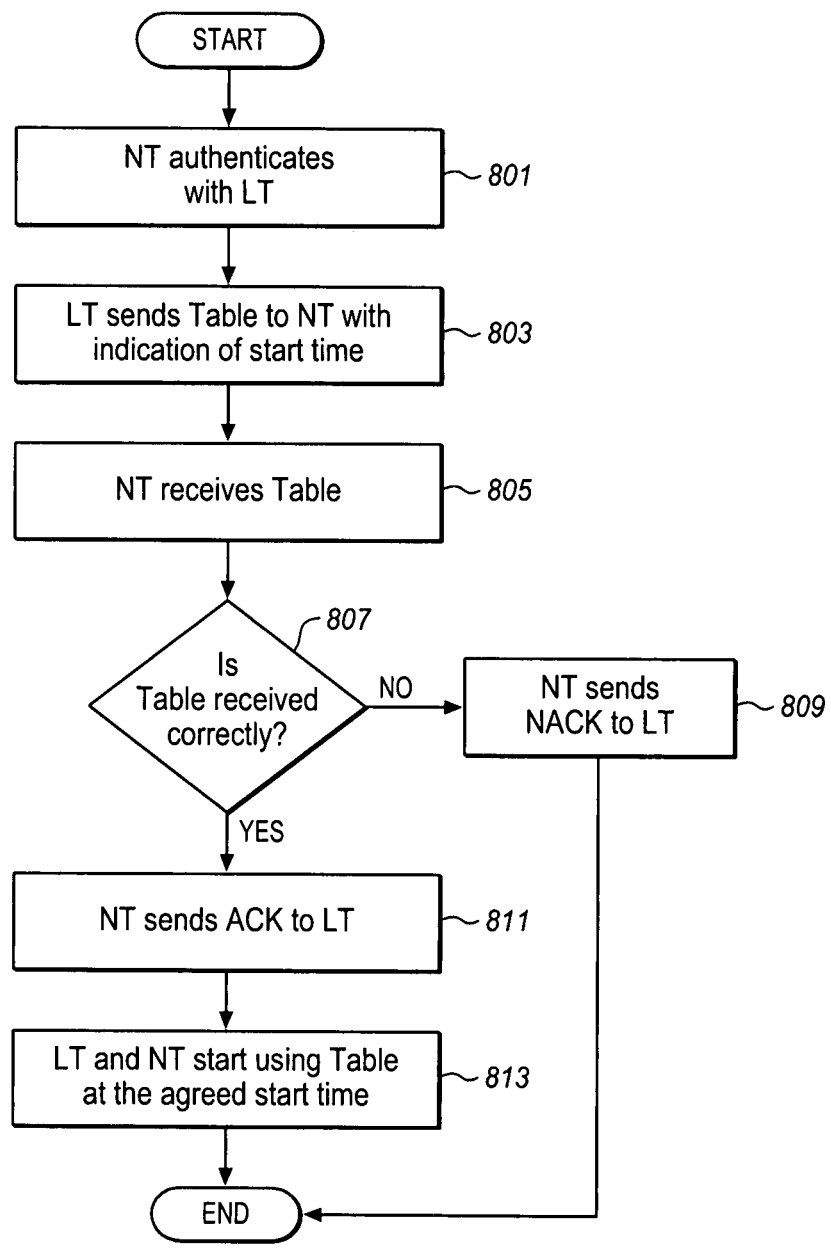
FIG. 14 is a process flow diagram of establishing communication between LT and NT according to an embodiment of the present invention.

FIG. 14 provides an example of how communications can be established between LT equipment at the CO or an intermediate location and NT equipment at the CPE. When the CPE NT equipment is installed and turned on, it can then start by initializing its communications with the LT at block 801. This can involve authentication, password and passkey exchange, equipment and subscription identification, any standards or conventions to be used in communications, and any other appropriate operations that may be desired before communication begins. These operations are typically performed using initialization messages or messages transported over the embedded operations channel (described by ITU-T Recommendations G.997.1, G994.1, G.992.1, G.992.3, G.992.5 and G.993.2), however, any other type of control channel can alternatively be used. After this authentication, the LT sends a table of transmission times to the NT together with an indication of the start time for using the table at block 803.

The table can take many forms. The master table maintained by the NT can have time slots or time intervals marked out with a pointer or reference to the user to which the assignment has been made. The time slots may be indicated by a start and end time or if the time slots are of uniform or standardized duration, then they may be indicated by a marker or index. The NT may receive the entire table or only the portion of the table that pertains to it. In an alternative embodiment, the table is a table or a list of frequencies or tones that are assigned for use by the NT. A variety of other types of tables or lists may be used instead of, or in addition, to these two possibilities.

At block 807, the NT determines whether the table or list has been accurately received. If not, then at block 809 a negative acknowledgment, NACK, is sent to the LT and the process ends. Another authentication can be attempted at another time, or the LT can attempt to send just the table or list again.

If the table is correctly received, then the NT can send a positive acknowledgment, ACK, to the LT. The table is stored into memory, the referenced start time is accessed and at block 813, the NT and LT start communications.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of a kind that is generally available. Examples of computer-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Examples have been provided herein using 4096 and/or 8192 tones in the frequency bandwidth of a DMT system, however, other frequency bandwidth spectra may be used, including wider bands of frequencies. Moreover, in some systems NEXT/echo cancellation may be used, while in other exemplary systems FDM is used. One technique may be more advantageous than another and/or have drawbacks relative to the other (for example, FDM's lower data rate relative to NEXT/echo cancellation techniques).

The following detailed description of the invention will refer to one or more embodiments of the invention, but is not limited to such embodiments. Rather, the detailed description is intended only to be illustrative. The detailed description given herein with respect to the Figures is provided for explanatory purposes as the invention extends beyond these limited illustrative and exemplary embodiments.

The many features and advantages of the present invention are apparent from the written description, and thus, the appended claims are intended to cover all such features and advantages of the invention. Further, since numerous modifications and changes are possible, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

The invention claimed is:

1. A Digital Subscriber Line (DSL) system, comprising:
a first DSL loop segment communicatively connected to a first user Customer Premises Equipment (CPE); a second DSL loop segment communicatively connected to a second user CPE;
a first junction to connect the first DSL loop segment to a third DSL loop segment;
a second junction to connect the second DSL loop segment to the third DSL loop segment;
a fourth DSL loop segment communicatively connected to the first user CPE;
a fifth DSL loop segment communicatively connected to the second user CPE;
a third junction to connect the fourth DSL loop segment to a sixth DSL loop segment;
a fourth junction to connect the fifth DSL loop segment to the sixth DSL loop segment; and
a line termination DSL device connected to the third DSL loop segment and the sixth DSL loop segment to combine multiple streams of DSL data communication received over the third DSL loop segment and the sixth DSL loop segment from the first user CPE and the second user CPE into a single channel and to multiplex DSL data communication into multiple data streams to be sent to the first user CPE and the second user CPE over the third DSL loop segment and the sixth DSL loop segment.

2. The DSL system of claim 1, wherein the line termination DSL device is coupled to a Central Office such that the third DSL loop segment transmits data communication from the first DSL loop segment and the second DSL loop segment to the Central Office.

3. The DSL system of claim 1, further comprising a controller coupled to the line termination DSL device to perform at least one of:

control frequency allocations or time allocations for use in carrying the DSL data communication of the first user CPE and the second user CPE on the third DSL loop segment and the sixth DSL loop segment;
allocate upstream or downstream transmission times to the first user CPE and the second user CPE; and
assign distinctive headers for use by the first user CPE and the second user CPE for use in upstream or downstream transmissions.

4. The DSL system of claim 3, wherein the controller assigns logical connections to the first user CPE and the second user CPE, each logical connection having transmission parameters and a transmission priority, there being more than one logical connection for at least one of the first user CPE and the second user CPE.

5. The DSL system of claim 3, wherein the controller detects at least one of:
reflections in data transmitted on the first DSL loop segment and the second DSL loop segment and assigns transmission parameters to the first user CPE and the second user CPE based on the detected reflections; and
improper terminations in the first DSL loop segment and the second DSL loop segment and assigns transmission parameters to the first user CPE and the second user CPE to compensate for the improper terminations.

6. The DSL system of claim 1, wherein the line termination DSL device further comprising a vectoring unit to vector data communication on the third DSL loop segment and the sixth DSL loop segment such that the DSL data communication is multiplexed into the multiple data streams to be sent to the first user CPE and the second user CPE over the third DSL loop segment and the sixth DSL loop segment.

7. The DSL system of claim 1, wherein the third DSL loop segment and the sixth DSL loop segment are bonded using either Time-division Inverse Multiplexing (TDIM) bonding, Ethernet bonding, Asynchronous Transfer Mode (ATM) bonding, or the Asymmetric Digital Subscriber Line 2+ (ADSL2+) port bonding protocol to combine the third DSL loop segment and the sixth DSL loop segment into a single logical channel.

8. A method comprising:
sending a first set of Digital Subscriber Line (DSL) data packets through a DSL loop segment to a first user CPE; and
sending a second set of DSL data packets through the DSL loop segment to a second user CPE, wherein the first set of DSL data packets and the second set of DSL data packets are multiplexed on the DSL loop segment; and
wherein sending the first set of DSL data packets comprises sending the first set of DSL data packets through the DSL loop segment to a first junction coupled to a second DSL loop segment, the second DSL loop segment being connected to the first user CPE and wherein sending the second set of DSL data packets comprises sending the second set of DSL data packets through the DSL loop segment to a second junction coupled to a third DSL loop segment, the third DSL loop segment being connected to the second user CPE.

9. The method of claim 8, wherein the first set of DSL data packets is sent using a different header than the second set of DSL data packets.

10. A method comprising:
sending a first set of Digital Subscriber Line (DSL) data packets through a DSL loop segment to a first user CPE;
sending a second set of DSL data packets through the DSL loop segment to a second user CPE, wherein the first set of DSL data packets and the second set of DSL data packets are multiplexed on the DSL loop segment; and wherein the DSL loop segment is in a common binder with at least one additional shared DSL loop segment and wherein the first set of DSL data packets and the second set of DSL data packets are demultiplexed onto the DSL loop segment and the at least one additional shared DSL loop segment.

11. The method of claim 10, wherein the first set of DSL data packets and the second set of DSL data packets are each demultiplexed by decomposing each of the first set of DSL data packets and the second set of DSL data packets into respective multiple data streams to be transmitted through the first DSL loop segment and the additional shared DSL loop segment.

12. An Apparatus comprising:
a plurality of DSL Loop Segments;
a multiplexer;
an inverse multiplexer;
a plurality of transceivers, each comprising a processor; and
wherein each DSL Loop Segment of the plurality of DSL loop Segments is coupled with a different transceiver, wherein each transceiver splits data from a DSL Loop segment into receive data wherein the receive data is processed by a packet inspection module executed by the processor in each transceiver which inspects selected packets and forwards all packets as a receive chain to the multiplexer, wherein the multiplexer combines receive chain packets from the plurality of transceivers into an aggregated stream to be forwarded; and
wherein the inverse multiplex receives a stream of packets and the stream of packets are inverse multiplexed into a separate stream, wherein the separate stream is forwarded to a packet transmission module executed by the processor in each transceiver where each packet of the stream of packets is marked and timing is added resulting in the creation of a plurality of transmit chains which are forwarded to an appropriate DSL loop segment of the plurality of DSL Loop segments.

13. The apparatus of claim 12:
wherein the transceivers of the apparatus each further comprise memory and wherein the transceivers are further coupled with an operations channel; and
wherein the transceivers' memory receive instructions which when executed by each respective transceivers' processor create initialization messages to uniquely identify packets transmitted through the plurality of DSL loop Segments using at least one of a header and a time slot.

14. The apparatus of claim 12:
wherein the transceivers of the apparatus are further coupled with an operations channel; and wherein the transceivers' processor receives encryption keys and parameters for use in encrypting packets for transmission and decrypting received packets.

15. A system comprising:
a first transceiver to send a first set of Digital Subscriber Line (DSL) data packets through a first DSL loop segment;
a second transceiver to send a second set of DSL data packets through a second DSL loop segment;
wherein the first set of DSL data packets and the second set of DSL data packets have been inverse multiplexed onto the first DSL loop segment and the second DSL loop segment respectively;
wherein the first transceiver sends the first set of DSL data packets through the first DSL loop segment to a first junction coupled with a third DSL loop segment; and
wherein the second transceiver sends the second set of DSL data packets through the second DSL loop segment to a second junction coupled to the third DSL loop segment.

16. The system of claim 15, wherein the first set of DSL data packets are sent by the first transceiver using a different header than the second set of DSL data packets sent by the second transceiver.

17. A system comprising:
a transceiver to receive a first set of Digital Subscriber Line (DSL) data packets through a first DSL loop segment;
the transceiver to further receive a second set of DSL data packets through the first DSL loop segment;
wherein the first set of DSL data packets and the second set of DSL data packets are received in a multiplexed signal from the first DSL loop segment;
a demultiplexer to demultiplex the first set of DSL data packets and the second set of DSL data packets from the multiplexed signal on the first DSL loop segment;
wherein the transceiver receives the first set of DSL data packets via the first DSL loop segment from a first junction coupled with a second DSL loop segment; and
wherein the transceiver receives the second set of DSL data packets via the first DSL loop segment from a second junction coupled to a third DSL loop segment.

18. The system of claim 17:
wherein the first set of DSL data packets and the second set of DSL data packets are sent by the transceiver; and
wherein both of the first set of DSL data packets and the second set of DSL data are each to be demultiplexed by decomposing each of the first set of DSL data packets and the second set of DSL data packets into respective multiple data streams transmitted through the first DSL loop segment.

* * * * *